United States Patent
Tran

(10) Patent No.: US 8,547,036 B2
(45) Date of Patent: Oct. 1, 2013

(54) SOLID STATE LIGHT SYSTEM WITH BROADBAND OPTICAL COMMUNICATION CAPABILITY

(75) Inventor: Bao Q. Tran, Saratoga, CA (US)

(73) Assignee: Available for Licensing, Saratoga, CA (US)

( * ) Notice: Subject to any disclaimer, the term of this patent is extended or adjusted under 35 U.S.C. 154(b) by 138 days.

(21) Appl. No.: 13/300,598

(22) Filed: Nov. 20, 2011

(65) Prior Publication Data

US 2012/0086345 A1   Apr. 12, 2012

(51) Int. Cl.
*H05B 37/02* (2006.01)
(52) U.S. Cl.
USPC ........... 315/291; 315/158; 315/297; 315/308; 398/130; 398/135
(58) Field of Classification Search
USPC .................. 315/158, 291, 294, 297, 307–308; 398/127, 130, 135
See application file for complete search history.

(56) References Cited

U.S. PATENT DOCUMENTS

| | | |
|---|---|---|
| 6,948,829 B2 | 9/2005 | Verdes |
| 7,072,587 B2 | 7/2006 | Dietz |
| 7,580,643 B2 * | 8/2009 | Moore et al. ................. 398/202 |
| 8,150,269 B2 * | 4/2012 | Sauerlander et al. ......... 398/172 |
| 2006/0056855 A1 * | 3/2006 | Nakagawa et al. ........... 398/183 |
| 2008/0310850 A1 | 12/2008 | Pederson |
| 2008/0317475 A1 | 12/2008 | Pederson |
| 2010/0106306 A1 * | 4/2010 | Simon et al. .................. 700/276 |
| 2010/0141153 A1 * | 6/2010 | Recker et al. ................. 315/149 |
| 2010/0327766 A1 * | 12/2010 | Recker et al. ................. 315/291 |
| 2011/0069960 A1 * | 3/2011 | Knapp et al. .................. 398/103 |

OTHER PUBLICATIONS

ANSI/ASHRAE Addendum q to ANSI/ASHRAE Standard 135-2008BACnet®—A Data Communication Protocol for Building Automation and Control Networks Jan. 2009.
Texas Instruments Microcontrollers for Advanced Lighting Solutions 2010.
J. Martocci, BACnet Unplugged, ZigBee and BACnet Connect, ASHRAE Journal, Jun. 2008.

* cited by examiner

*Primary Examiner* — Jason M Crawford
(74) *Attorney, Agent, or Firm* — Tran & Associates

(57) ABSTRACT

Systems and methods are disclosed for use in conjunction with a standardized electrical connector of a conventional light bulb or tube with one or more light emitting diodes (LEDs) electrically coupled to at least one electrical connector compatible with a conventional light connector, wherein the LEDs include at least one multiband-type ultra-wideband (UWB) transceiver having one or more optical channels defined using one or more OFDM bands; and a controller coupled to the LEDs, the controller adjusting LED light output and communicating with the optical network using the optical transmitter and receiver. In other embodiments, the LEDs include at least one optical transmitter and receiver optically coupled to an optical network using at least one LED with a first mode to generate light and a second mode to receive optical transmissions using ambient light.

20 Claims, 9 Drawing Sheets

SOLID STATE LIGHT SYSTEM WITH BROADBAND OPTICAL COMMUNICATION CAPABILITY

BACKGROUND

The present invention relates to a light system with communication capability.

Advances in computer and wireless communication technology have resulted in convenient access to data for the population. One common wireless technology, IEEE 802.11, is used to provide wireless local area network (WLAN) computer communication in the 2.4, 3.6 and 5 GHz frequency bands. They are created and maintained by the IEEE LAN/MAN Standards Committee (IEEE 802). The base version of the standard IEEE 802.11-2007 has had subsequent amendments. These standards provide the basis for wireless network products using the Wi-Fi brand name.

To connect to a Wi-Fi LAN, a computer has to be equipped with a wireless network interface controller. The combination of computer and interface controller is called a station. All stations share a single radio frequency communication channel. Transmissions on this channel are received by all stations within range. The hardware does not signal the user that the transmission was delivered and is therefore called a best-effort delivery mechanism. A carrier wave is used to transmit the data in packets, referred to as "Ethernet frames". Each station is constantly tuned in on the radio frequency communication channel to pick up available transmissions.

A Wi-Fi-enabled device, such as a personal computer, video game console, smartphone or digital audio player, can connect to the Internet when within range of a wireless network connected to the Internet. The coverage of one or more (interconnected) access points—called hotspots—comprises an area as small as a few rooms or as large as many square miles. Coverage in the larger area may depend on a group of access points with overlapping coverage.

On a parallel note, buildings typically include various systems for controlling conditions inside the buildings, such as heating, ventilating, and air conditioning (HVAC) systems and lighting systems. HVAC systems and lighting systems generally operate independent from one another. For example, a thermostat can be set to control operation of an HVAC system, while a lighting system can be turned on and off using a wall-mounted switch.

At present, building operations can be controlled through wireless transceivers such as Zigbee transceivers. Some of the world's leading utilities, energy service providers, product manufacturers and technology companies are supporting the development of ZigBee Smart Energy. Several other standards groups are also involved with extending the reach of ZigBee Smart Energy to more homes around the world.

U.S. Pat. No. 6,948,829 discloses a light emitting diode (LED) light bulb that includes plural individual elements as sub-assembly elements of the overall light bulb. Different sub-assembly elements of a lens, a LED printed circuit board, a housing also functioning as a heat sink, a lower housing, and other individual sub-assembly components are utilized. The LED printed circuit board sub-assembly containing the LEDs can also be provided relatively close to a base.

U.S. Pat. No. 7,580,643 discloses an optical data communications receiver for receiving data encoded using optical pulse position, the receiver having an optical signal reception device; a reference signal memory for storing a reference channel response signal; and a correlator coupled to the reference signal memory and to the optical signal reception device for correlating a received optical pulse with the stored reference channel response signal to determine the optical pulse position; an output coupled to the correlator to provide pulse position data for the received optical pulse.

U.S. Patent Application 20080317475 discloses an LED light and communication system in communication with a broadband over power line communications system. The LED light and communication system includes at least one optical transceiver. The optical transceiver includes a light support having a plurality of light emitting diodes and at least one photodetector attached thereto, and a processor. The processor is in communication with the light emitting diodes and the at least one photodetector. The processor is constructed and arranged to generate a communication signal. The at least one optical transceiver is engaged to a clock, and the clock is in communication with the broadband over power line communications system.

U.S. Patent Application 20100106306 discloses an LED-based light that can be installed in a conventional light fixture. The LED-based light can include a sensor operable to output a first signal indicative of whether an area of one or more of the rooms is in an occupied state or a non-occupied state, and the LED-based light can also include an LED controller operable to control at least one LED in the light in response to the first signal. Additionally, the LED-based light can include a transmitter operable to output a second signal indicative of whether the area is in the occupied state or the non-occupied state to a building environment regulator.

SUMMARY

An LED-based light as described herein relates to "smart buildings" that can automatically control various environmental characteristics of one or more rooms in a building and provide broadband optical data communication.

Systems and methods are disclosed for use in conjunction with a standardized electrical connector of a conventional light bulb or tube with one or more light emitting diodes (LEDs) electrically coupled to at least one electrical connector compatible with a conventional light connector, wherein the LEDs include at least one multiband-type ultra-wideband (UWB) transceiver having one or more optical channels defined using one or more OFDM bands; and a controller coupled to the LEDs, the controller adjusting LED light output and communicating with the optical network using the optical transmitter and receiver. In one implementation, the LEDs include at least one optical transmitter and receiver optically coupled to an optical network using at least one LED with a first mode to generate light and a second mode to receive optical transmissions using ambient light.

In another aspect, a system for use in conjunction with a standardized electrical connector of a conventional light bulb or tube includes one or more light emitting diodes (LEDs) electrically coupled to at least one electrical connector compatible with a conventional light connector, wherein the LEDs include at least one optical transmitter and receiver optically coupled to an optical network using at least one LED with a first mode to generate light and a second mode to receive optical transmissions using ambient light; and a controller coupled to the LEDs, the controller adjusting LED light output and communicating with the optical network using the optical transmitter and receiver.

In yet another aspect, an LED-based light tube operable in cooperation with a building environment regulator that provides high speed data communication and regulates at least one environmental condition in one or more rooms of a building. The LED-based light includes a tube including a light transmitting portion and a pair of electrical connectors attached to opposing ends of the tube, the electrical connectors compatible with a standard fluorescent light fixture; one or more first LEDs operable to produce light that passes through the light transmitting portion of the tube; one or more second LEDs operable as a light sensor to generate a first signal whether an area of one or more of the rooms is in an occupied state or a non-occupied state; one or more third LEDs providing an optical communication system; and a controller operable to control the first LEDs in response to the first signal and communicating with other devices through the one or more third LEDs the first signal indicative of whether the area is in the occupied state or the non-occupied state to the building environment regulator.

In one example, a system for use in conjunction with a conventional light fixture that is electrically connected to a power source and that is configured to receive a standardized electrical connector of a conventional light and with a building environment regulator that regulates at least one environmental condition in one or more rooms of a building is described. The system features an LED-based light including at least one electrical connector compatible with the conventional light fixture, at least one LED, a sensor operable to output a first signal indicative of whether an area of one or more of the rooms is in an occupied state or a non-occupied state, an LED controller operable to control the at least one LED in response to the first signal, and a transmitter operable to transmit a second signal indicative of whether the area is in the occupied state or the non-occupied state. A regulator controller in communication with the transmitter is operable to control one or more functions of the building environment regulator in response to the second signal.

In another example, an LED-based light tube operable in cooperation with a building environment regulator that regulates at least one environmental condition in one or more rooms of a building is described. The LED-based light tube features a tube including a light transmitting portion. A pair of electrical connectors are attached to opposing ends of the tube, and the electrical connectors are compatible with a standard fluorescent light fixture. At least one LED is operable to produce light that passes through the light transmitting portion of the tube. A sensor is operable to output a first signal indicative of whether an area of one or more of the rooms is in an occupied state or a non-occupied state. An LED controller is operable to control the at least one LED in response to the first signal. A transmitter is operable to output a second signal indicative of whether the area is in the occupied state or the non-occupied state to the building environment regulator.

Advantages of the preferred embodiments may include one or more of the following. Examples of LED-based lights described herein can be used to transform a building with standard fixtures, such as standard fluorescent tube fixtures, into a smart building. The system is compatible with standard building fixtures, such as conventional fluorescent tube fixtures, and thus does not require an electrician to install. Many advantages are offered by the LED-based lights described herein, such as allowing for a low-cost smart building. The system can provide smart lighting solutions that provide:

Optical building solutions embody the prevailing goal of sustainable buildings: Reduce, Reuse, Recycle. Fewer wired and more wireless solutions mean less disposed cabling will end up in landfills and less waste will be burned and emitted as toxic gases into the environment.

System Retrofits—Wireless optical solutions are ideally suited for existing spaces because they eliminate the need to remove floors, walls or ceilings to access control products. People or processes no longer need to relocate while upgrades are under way, allowing continued access to labs, sensitive storage, health facilities and critical process areas.

Reconfiguring Space—Open floor plans, multi-purpose areas or temporary spaces can now be automated. Wireless optical controls and optical sensors can be easily moved to suit the needs of tenants or one-time events. Conference and exhibition halls, warehouses, and auditoriums are just a few examples of spaces that are frequently restructured for different purposes.

Structural Restrictions—Buildings or areas with concrete, marble and cinderblock can now be wirelessly controlled using light. Spaces with atriums, high ceilings, historical features and other unique architectural elements can now be controlled wirelessly and without expensive wiring or worry of damaging unique architectural features.

Sensitive Environments—Facilities such as hospitals, museums, labs and data centers often house materials requiring very precise and stable air conditioning and are ideally suited for wireless optical control. With non-invasive installation, wireless optical control products make it possible for these areas to perform to the best of their ability.

DESCRIPTION

Figure 1:
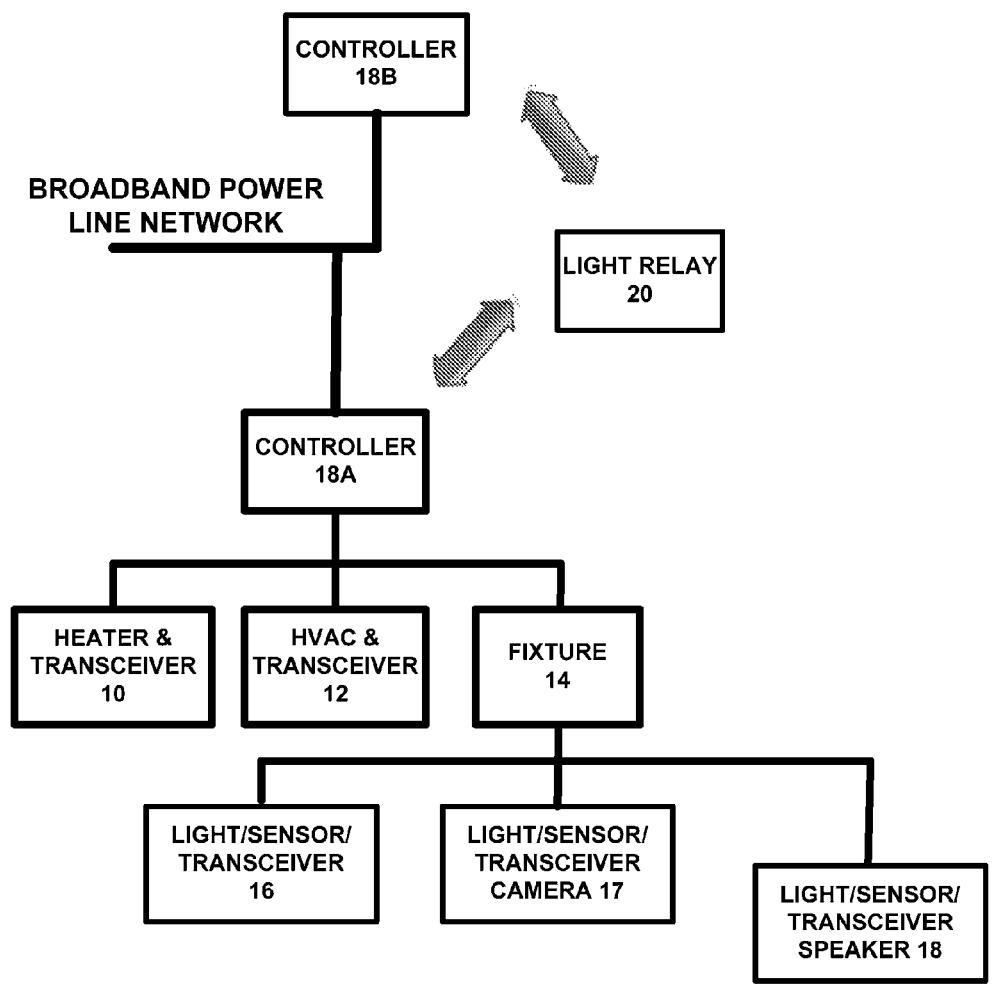
FIG. 1 shows an exemplary smart building with optical networking.

As shown in FIG. 1, a smart building system for use in a building can include a heater & transceiver 10, an HVAC system with transceiver 12, a light fixture 14, an LED-based light 16, a controller 18A. The controller 18A communicates with one or more light relays or repeaters 20. The HVAC system 12 can include known HVAC components, such as a heater, an air conditioner, fans, a thermostat, and ductwork. The HVAC system 12 can regulate the temperature, humidity, and/or other air quality considerations in one or more rooms of the building. For example, the HVAC system 12 can maintain the temperature in one or more rooms of the building at a level near a setpoint temperature input to the thermostat. The HVAC system 12 can also be capable of controlling airflow between the building and the environment surrounding the building, such as by opening or closing vents, windows, skylights, and other barriers between the building and the surrounding environment. In addition or alternative to the HVAC system 12, the smart building system 10 can include another type of temperature control system (e.g., a control for heated floors), another type of light control system (e.g., a control for window shades or dynamically tinted windows), or some other control for the building. The HVAC system 12 can be in communication with the controller 18 as is described below in greater detail.

The light fixture 14 can be designed to accept standard fluorescent tubes, such as a T-5, T-8, or T-12 fluorescent tube, or other standard sized light, such as incandescent bulbs. Alternatively, the fixture 14 can be designed to accept non-standard sized lights, such as lights installed by an electrician. Additionally, the fixture 14 can include one or more fixtures. The fixture 14 can be in communication with the controller 18 for controlling the operation of the light 16 as is described below in greater detail.

Figure 2:
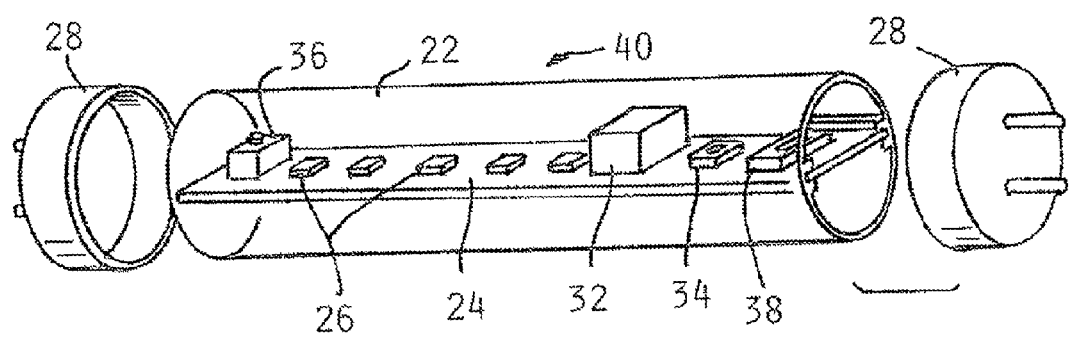
FIG. 2 shows an exemplary light tube (florescent light tube replacement) that communicates over optical networking.

The LED light tube 16 can include a housing 22, a circuit board 24, LEDs 26, and a pair of end caps 28 as shown in FIG. 2. The housing 22 as shown in FIG. 2 is light transmitting and has the shape of a cylindrical tube. The housing 22 can be made from polycarbonate, acrylic, glass or another light transmitting material (i.e., the housing 22 can be transparent or translucent). For example, a translucent housing 22 can be made from a composite, such as polycarbonate with particles of a light refracting material interspersed in the polycarbonate. While the illustrated housing 22 is cylindrical, housings having a square, triangular, polygonal, or other cross sectional shape can alternatively be used. Similarly, while the illustrated housing 22 is linear, housings having an alternative shape, e.g., a U-shape or a circular shape can alternatively be used. Additionally, the housing 22 need not be a single piece as shown in FIG. 2. Instead, another example of a housing can be formed by attaching multiple individual parts, not all of which need be light transmitting. For example, such a housing can include an opaque lower portion and a lens or other transparent cover attached to the lower portion to cover the LEDs 26. The housing 22 can be manufactured to include light diffusing or refracting properties, such as by surface roughening or applying a diffusing film to the housing 22. For compatibility with the fixture 14 as discussed above, the housing 22 can have a length such that the light 16 is approximately 48" long, and the housing 22 can have a 0.625", 1.0", or 1.5" diameter.

The circuit board 24 as illustrated in FIG. 2 is an elongate printed circuit board. Multiple circuit board sections can be joined by bridge connectors to create the circuit board 24. The circuit board 24 as shown in FIG. 2 is slidably engaged with the housing 22, though the circuit board 24 can alternatively be clipped, adhered, snap- or friction-fit, screwed or otherwise connected to the housing 22. For example, the circuit board 24 can be mounted on a heat sink that is attached to the housing 22. Also, other types of circuit boards may be used, such as a metal core circuit board. Or, instead of a circuit board 24, other types of electrical connections (e.g., wires) can be used to electrically connect the LEDs 26 to a power source.

The light 16 can include two bi-pin end caps 28 (i.e., each end cap 18 can carry two pins), one at each longitudinal end of the housing 22, for physically and electrically connecting the light 16 to the fixture 14. The end caps 28 can be the sole physical connection between the light 16 and the fixture 14. The end caps 28 can be electrically connected to the circuit board 24 to provide power to the LEDs 26. Each end cap 18 can include two pins, though two of the total four pins can be "dummy pins" that do not provide an electrical connection. Alternatively, other types of electrical connectors can be used, such as an end cap carrying a single pin. Also, while the end caps 28 are shown as including cup-shaped bodies, the end caps 28 can have a different configuration (e.g., the end caps 28 can be shaped to be press fit into the housing 22). One or both of the end caps 28 can additionally include electric components, such as a rectifier and filter.

The LEDs 26 can be surface-mount devices, though other types of LEDs can alternatively be used. For example, although surface-mounted LEDs 26 are shown, one or more organic LEDs can be used in place of or in addition thereto.

The LEDs 26 can be mounted to the circuit board 24 by solder, a snap-fit connection, or other means. The LEDs 26 can produce white light. However, LEDs that produce blue light, ultra-violet light or other wavelengths of light can be used in place of white light emitting LEDs 26. The number of LEDs 26 can be a function of the desired power of the light 16 and the power of the LEDs 26. For a 48" light, such as the light 16, the number of LEDs 26 can vary from about five to four hundred such that the light 16 outputs approximately 500 to 3,000 lumens. However, a different number of LEDs 26 can alternatively be used, and the light 16 can output a different amount of lumens. The LEDs 26 can be evenly spaced along the circuit board 24, and the spacing of the LEDs 26 can be determined based on, for example, the light distribution of each LED 26 and the number of LEDs 26.

The controller 18 can include a memory and a CPU for executing a program stored on the memory. The controller 18 receives data from sensor located in the light 40 or external to the light 40. The sensor can include a motion sensor, a sensor for determining whether a door is ajar, a sensor for determining when a keypad or other type of lock is actuated, a voice-activated sensor, a clock or calendar, an ambient light sensor, a power supply monitor, and/or another type of sensor. The sensor can include multiple types of sensors for detecting different types of activities (e.g., the sensor can include a clock and a motion sensor). Additionally, the sensor can include multiple sensors in different rooms or spaces of the building. In operation, the sensor can perform detection and, in response, send the detection signal $\alpha$ to the controller 18. The detection signal can indicate whether the building is in an occupied state or an unoccupied state. For example, if the sensor includes a motion detector, the sensor can send the detection signal to the controller 18 to indicate the building is in the occupied state when motion is detected. The sensor can continuously send the detection signal to the controller 18, or the sensor can send the detection signal only when a positive detection (e.g., an indication that the building is in the occupied state) occurs. The detection signal a can also indicate that the building is in the unoccupied state when, for example, a predetermined amount of time has passed since a positive detection last occurred, or when the sensor 20 includes a clock and the time is past normal working hours. Also, the detection signal a can include signals from multiple types of sensors making up the sensor, such as a voice-activated sensor, a motion sensor, and a clock. If the controller 18 receives signals from multiple sensors in different locations, the detection signal can include a location of the detection (e.g., a specific room or area of the building).

The light can communicate data at broadband speed. Broadband in telecommunications refers to a signaling method that includes or handles a relatively wide range (or band) of frequencies. Broadband is always a relative term, understood according to its context. The wider (or broader) the bandwidth of a channel, the greater the information-carrying capacity, given the same channel quality. In radio, for example, a very narrow-band signal will carry Morse code; a broader band will carry speech; a still broader band is required to carry music without losing the high audio frequencies required for realistic sound reproduction. This broad band is often divided into channels or frequency bins using passband techniques to allow frequency-division multiplexing, instead of sending one higher-quality signal. A television antenna described as "broadband" may be capable of receiving a wide range of channels; while a single-frequency or Lo-VHF antenna is "narrowband" since it only receives 1 to 5 channels. For example, in data communications a 56 k modem will transmit a data rate of 56 kilobits per second (kbit/s) over a 4 kilohertz wide telephone line (narrowband or voiceband). The various forms of Digital Subscriber Line (DSL) services are broadband in the sense that digital information is sent over a high-bandwidth channel. This channel is at higher frequency than the baseband voice channel, so it can support plain old telephone service on a single pair of wires at the same time. However when that same line is converted to a non-loaded twisted-pair wire (no telephone filters), it becomes hundreds of kilohertz wide (broadband) and can carry several megabits per second using very-high-bitrate digital subscriber line (VDSL) techniques. In one embodiment, broadband implies at least the speed of WiFi, cable modem, or DSL transmission speed as opposed to the data speed of a conventional TV remote controller.

The controller 18 can run a tunneling protocol where one network protocol (the delivery protocol) encapsulates a different payload protocol. By using tunneling one can (for example) carry a payload over an incompatible delivery-network, or provide a secure path through an untrusted network. Tunneling typically contrasts with a layered protocol model such as those of OSI or TCP/IP. The delivery protocol usually (but not always) operates at a higher level in the model than does the payload protocol, or at the same level. Tunneling protocols may use data encryption to transport insecure payload protocols over a public network (such as the Internet), thereby providing VPN functionality. IPsec has an end-to-end Transport Mode, but can also operate in a tunneling mode through a trusted security gateway.

Another implementation of the optical network communicates through a secure shell (SSH) tunnel. SSH tunnel consists of an encrypted tunnel created through a SSH protocol connection. Users may set up SSH tunnels to transfer unencrypted traffic over a network through an encrypted channel. For example, Microsoft Windows machines can share files using the Server Message Block (SMB) protocol, a non-encrypted protocol. If one were to mount a Microsoft Windows file-system remotely through the Internet, someone snooping on the connection could see transferred files. To mount the Windows file-system securely, one can establish an SSH tunnel that routes all SMB traffic to the remote fileserver through an encrypted channel. Even though the SMB protocol itself contains no encryption, the encrypted SSH channel through which it travels offers security. To set up an SSH tunnel, one configures an SSH client to forward a specified local port to a port on the remote machine. Once the SSH tunnel has been established, the user can connect to the specified local port to access the network service. The local port need not have the same port number as the remote port. SSH tunnels provide a means to bypass firewalls that prohibit certain Internet services—so long as a site allows outgoing connections. For example, an organization may prohibit a user from accessing Internet web pages (port 80) directly without passing through the organization's proxy filter (which provides the organization with a means of monitoring and controlling what the user sees through the web). But users may not wish to have their web traffic monitored or blocked by the organization's proxy filter. If users can connect to an external SSH server, they can create an SSH tunnel to forward a given port on their local machine to port 80 on a remote web-server. To access the remote web-server, users would point their browser to the local port at http://localhost/. Some SSH clients support dynamic port forwarding that allows the user to create a SOCKS 4/5 proxy. In this case users can configure their applications to use their local SOCKS proxy server. This gives more flexibility than creating an SSH tunnel to a single port as previously described. SOCKS can free the user from the limitations of connecting only to a predefined remote port and server. If an application doesn't support SOCKS, one can use a "socksifier" to redirect the application to the local SOCKS proxy server. Some "socksifiers" support SSH directly, thus avoiding the need for an SSH client.

In one embodiment, the controller 18 tunnels with BACnet, a building automation and networking protocol for building automation, to fully support BACnet over Optical Building Automation networks. The light with optical communication extends wired BACnet-based building systems to new areas in a convenient and low cost manner.

In operation, the controller 18 can control the function of the HVAC system 12 and the light 16 in response to the detection signal, such as when the detection signal indicates the building state has changed from the occupied state to the unoccupied state and vice versa. For example, the controller 18 can output a control signal to turn on the HVAC system 12 and the light 16 in response to a detection signal indicating the building is in the occupied state, and the controller 18 can output the control signal to turn off the HVAC system 12 and the light 16 in response to an indication that the building is in the unoccupied state.

As another example of operation of the smart building system 10, if the sensor 20 includes a power supply monitor, the detection signal a can indicate an amount of power used by the building or certain systems of the building (e.g., an amount of power used in the aggregate by the HVAC system 12 and the light 16). Alternatively, instead of receiving the detection signal a expressly indicating an amount of power used by the building, the controller 18 can estimate the building power usage based on, e.g., the time of day if the sensor 20 includes a clock, the time of year if the sensor 20 includes a calendar, the number of areas of the building occupied, and/or other considerations. That is, the estimate can be based on assumptions such as the building using less power at night, the building using more power during cold weather, the building using more power when heavily occupied, and other assumptions.

The controller 18 can analyze the power consumption of the building to determine the control signal. For example, when the power consumption is high (e.g., above a predetermined amount), the controller 18 can reduce an amount of power provided to the light 16, thereby dimming the light 16. As another example, the controller 18 can determine or estimate which spaces of the building are occupied, and only provide light to those areas (or not reduce light to those areas) during times of high power consumption. The controller 18 can allow occupants to override the control signal β if the amount of light provided by the light 16 is not deemed appropriate by occupants. Similarly, the controller 18 can control the HVAC system 12 based on the power consumption of the building, such as by allowing the temperature in unoccupied areas of the building to increase or decrease.

Thus, as explained in various examples above, the control signal can be solely based on, partially based on, or not based on whether the building is in the occupied state or unoccupied state. Among other advantages, the smart building system 10 can allow for energy efficient operation of the HVAC system 12 and the light 16 as explained in various examples above. Additionally, the controller 18 can control operation of the HVAC system 12 and light 16 without effort by occupants of the building, such as by eliminating the need for occupants to turn the light 16 on or off upon entering and exiting the an area of the building. The controller 18 can also control the HVAC system 12 and/or light 16 based on the power drawn by the building to, for example, reduce the power consumption of the HVAC system 12 and/or light 16 during times of high power consumption.

The usefulness of embodiments of the present invention is illustrated, for example, by smoke alarm. Since it is optically enabled, it can broadcast to the controller 18 the existence of a fire. The location of the smoke alarm will preferably be stored, so the location and existence are both immediately known. Since the whole network is aware of the site of the fire, the nearest personnel can implement evacuation plans. Likewise, public address system can immediately direct traffic in the event of an emergency. A camera provides video feed of the activity in a given room, thus enhancing security. If audio and/or video is enabled, through one or more personal communications badges or separate wall-mounted cameras, the video can be used to capture the last-known conditions of a user or an area. This can be important in the event a disaster that results in significant destruction of property or life. Monitoring of thermostat by the network allows the temperature of a room to be controlled according to various factors such as outdoor temperature, building temperature, and the number of occupants. Thus communication, security, and energy/building management are vastly improved through the optical transmitter and receiver of the optical network.

FIG. 2 shows an exemplary light 40 with optical communication capability. The light 40 can include a controller 32 mounted on the circuit board 24. The controller 32 can include a CPU and a memory storing a program to be executed by the CPU, and the controller 32 can be in communication with the LEDs 26 via the circuit board 24 or by other means (e.g., wires separate from the circuit board 24). Also, while the light 40 is shown and described as being shaped for compatibility with a fluorescent tube accepting fixture, the light 40 can have an alternative shape, such as an incandescent bulb or another type of light, and can use alternative sources of light, such as an incandescent, fluorescent, or halogen light. The light 40 can include a receiver 34 mounted on the circuit board 24. The sensors 20 can be in communication with a transmitter (not shown) for transmitting the detection signal a to the receiver 34. For example, the receiver 34 can be in communication with the transmitter using a standard wireless protocol (e.g., a radio standard, a cellular standard such as 3G, Bluetooth, or WiFi). The receiver 34 can alternatively be in communication with the transmitter in another manner such as hardwiring or via electric signals sent through the end caps 28. The receiver 34 can also be in communication with the controller 32 (e.g., the controller 32 and receiver 34 can communicate via the circuit board 24, or the controller 32 and receiver 34 can be an integral unit), allowing the receiver 34 to communicate the detection signal to the controller 32. The controller 32 can control the LEDs 26 in response to the detection signal a detected by the sensors 20 similar to the controller 18 controlling the light 16. Since the receiver 34 can be wireless, the light 30 can be installed in a standard fluorescent fixture as easily as a normal fluorescent tube. A sensor 36 mounted on the circuit board 24 can include a motion sensor, a voice-activated sensor, a clock or calendar, an ambient light sensor, and/or another type of sensor. The sensor 36 can include multiple types of sensors for detecting different types of activities (e.g., the sensor 36 can include a clock and a motion sensor). The sensor 36 can be in communication the controller 32 via the circuit board 24 or by other means, such as being hard wired to the controller 32 or formed integrally with the controller 32. The light 40 can additionally include a transmitter 38 for communicating by way of a standard wireless protocol or other means (e.g., hardwiring) to a remote location, such as a smart building control center. The transmitter 38 can be in communication with the sensor 36 via the circuit board or by other means, such as being hard wired to the sensor 36 or formed integrally with the sensor 36.

In operation, the sensor 36 can perform detection and, in response, send the detection signal to the controller 32. The controller 32 can perform at least one of a variety of functions in response to the detection signal. The controller 32 can control the LEDs 26 based on whether the area of the building in which the light 40 is located is occupied or unoccupied. For example, a motion sensor portion of the sensor 36 can indicate whether the area of the building in which the light 40 is located is occupied, and the controller 32 can turn the LEDs 26 on or off (or otherwise control the LEDs 26) based on the detection signal. The light transmitter 38 allows the light 40 to communicate the detection signal to a remote location, such as a smart building control center that can control operation of other building systems (e.g., an HVAC system). Thus, the detection signal α picked up by the sensor 36 can be used as an input to control portions of a smart building other than the light 40. As an example, if the sensor 36 includes a motion detector, a smart building control center can alter the control of an HVAC system when the sensor 36 indicates a predetermined amount of time has passed since motion was last detected.

The light 40 can also include a light receiver 34. Including the light receiver 34 allows the controller 32 of the light 40 to control the LEDs 26 based on signals picked up from sensors outside the light 40, such as a power supply sensor or a remote ambient light sensor (though an ambient light sensor integral with the light 40 can alternatively or additionally be used). The controller 32 can control the LEDs 26 in the light 40 based on, for example, a low power availability indication transmitted to the receiver 34. Thus, the controller 32 can reduce the power consumption of the LEDs 26 during times that the building is using a large amount of power, when a generator is providing power, or at other times during which power should be conserved.

While the light 40 is shown as being compatible with standard sized fluorescent fixtures, an LED-based light having another shape, such as an incandescent bulb or another type of light, can alternatively be used. Also, other types of light sources, such as fluorescent or incandescent based light sources, can be used instead of the LEDs 26.

Figure 3:
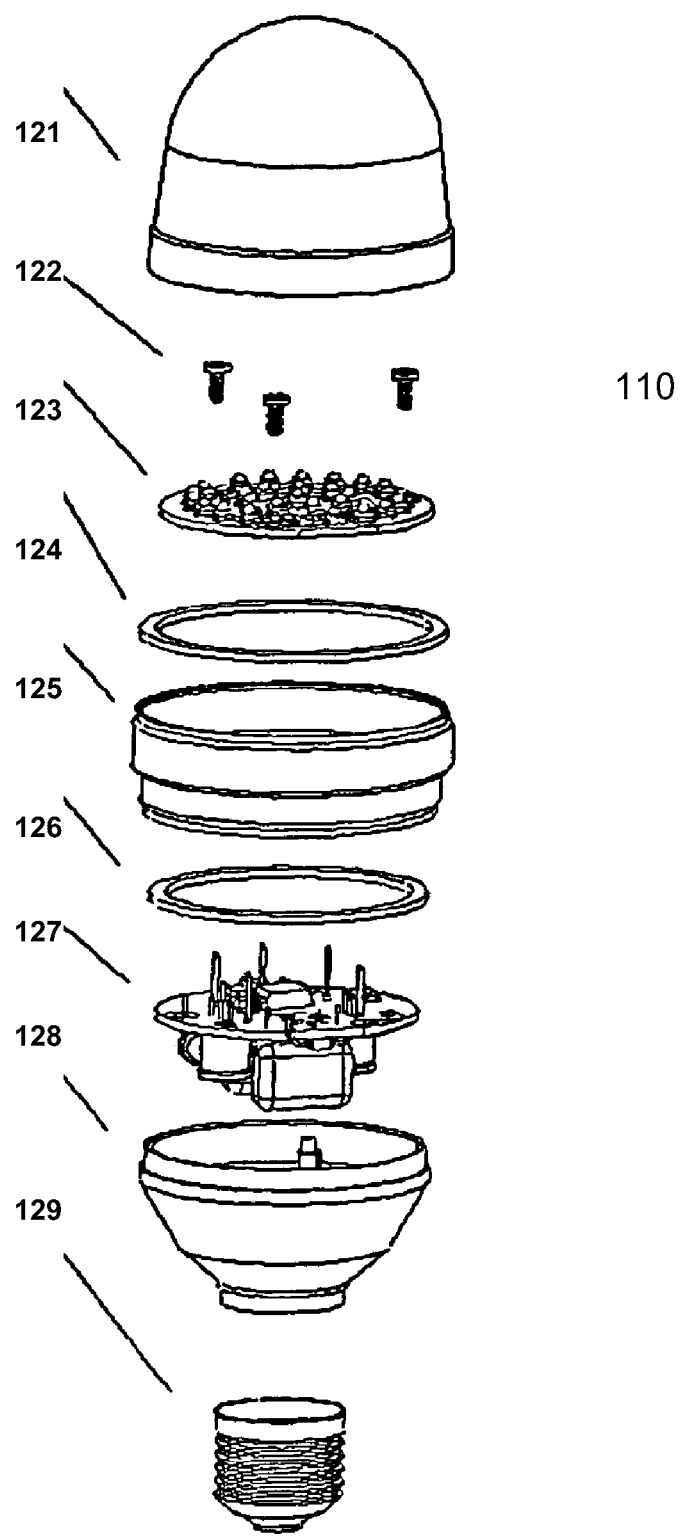
FIG. 3 shows an exemplary light bulb that communicates over optical networking.

Turning now to FIG. 3, an exemplary LED light bulb with optical communication and smart capability is shown. As shown in FIG. 3, the LED light bulb 110 includes a lens 121, which may typically be formed of plastic. A center housing 125 also operating as a heat sink is provided. An LED printed circuit board (PCB) sub-assembly 123 including plural LEDs is mounted to the center housing 125 with a gasket lens 124 therebetween by plural screws 122. The gasket lens 124 is not a required element when assembling the LED PCB sub-assembly 123. The gasket lens 124 goes around the outside edge of the LED PCB sub-assembly 123 and is provided to create a seal between the lens 121 and the housing 125. The lens 121 is then fit over the LED PCB sub-assembly 123 and can be adhesively secured to the center housing 125. The lens 121 can be mechanically secured to the housing 125 by, for example, a crimping operation in which the top edge of the housing 125 is curled over a lip of the lens 121. Such a lens assembly can be a last operation in assembling the overall light bulb 110. Such an operation assists in designing options in lens profiles depending on customer requirements. The center housing 125 is then connected to a lower housing 128 through a housing gasket 126. The lower housing 128 is then secured onto the base 129. The base 129 is configured to fit into an electrical socket.

The center housing 125 can preferably be a finished aluminum part designed to dissipate heat away from the LED PCB sub-assembly 123. The housing 125 is designed to work with the lens 121 profile and the lower housing 128 for assembly purposes. Such a layout allows fitting different types of LED technologies without having to change other components.

A power supply printed circuit board (PCB) sub-assembly 127 is also provided to fit into the lower housing 128. The power supply PCB sub-assembly 127 includes electrical connections to connect with the LED PCB sub-assembly 23 to supply power to the LEDs on the LED PCB sub-assembly 123.

The center housing 125 can operate as a heat sink to thereby allow the use of plural currently available LEDs to be mounted on the LED PCB sub-assembly 123. Further, the LED PCB sub-assembly 123 is essentially only one module of the entire light bulb 110. As a result, the LED PCB sub-assembly 123 can be easily modified to be varied for different desired applications and to suit new LED technology as it becomes available. That is, as the separate LED PCB sub-assembly 123 is a sub-element with the noted structure, it is easy to modify that sub-assembly 123 in terms of, for example, the LEDs mounted thereon, without changing the size, shape, etc. of the LED PCB sub-assembly 123 so that it can still be fit into the same existing LED light bulb 110. Since the LED PCB sub-assembly 123 is a simple modular element, it can be designed to mix different color LEDs for different particular applications as selected by different customers. Such different LED PCB sub-assemblies 123 can then easily and economically be manufactured into the same LED light bulb 110. Further, by utilizing a lower housing 128 as a modular element, that lower housing 128 can be changed to achieve different height requirements in different light bulbs. As the lens 121 is also only a sub-assembly component of the overall light bulb 110, the lens 121 can be changed in its shape, material, etc., to suit different requirements.

Different options can be easily manufactured by merely changing an LED printed circuit board sub-assembly as one element of the overall light bulb. Such manufacturing flexibility can significantly enhance the cost structure, design time, manufacturing flexibility, etc. of manufacturing an LED light bulb.

In one embodiment, a speaker can be added to the bulb. Music can be transmitted from a digital source, such as a PC or iPod, to an Edison screw type screw-in bulb that combines a 20 watt speaker with a 10 watt LED lamp. A music source is plugged into the included transmitter, and a remote is used to both dim the lights and control the sending of the stereo signal to pairs of speakers. The transmitter can control up to four pairs of speakers, and send two different streams of music to them.

In one embodiment, the system can track position of a badge wearer. The wearer can be an elderly person at home so that they can be assisted if needed. In one embodiment, each light is mapped to an indoor position. As the wearer moves around, each light communicates with a transceiver on the badge and provides the badge with a local coordinate. The badge and/or the light above the badge then reports the indoor position of the person to a computer that tracks the movement of the wearer and other daily activities of life.

Figure 4:
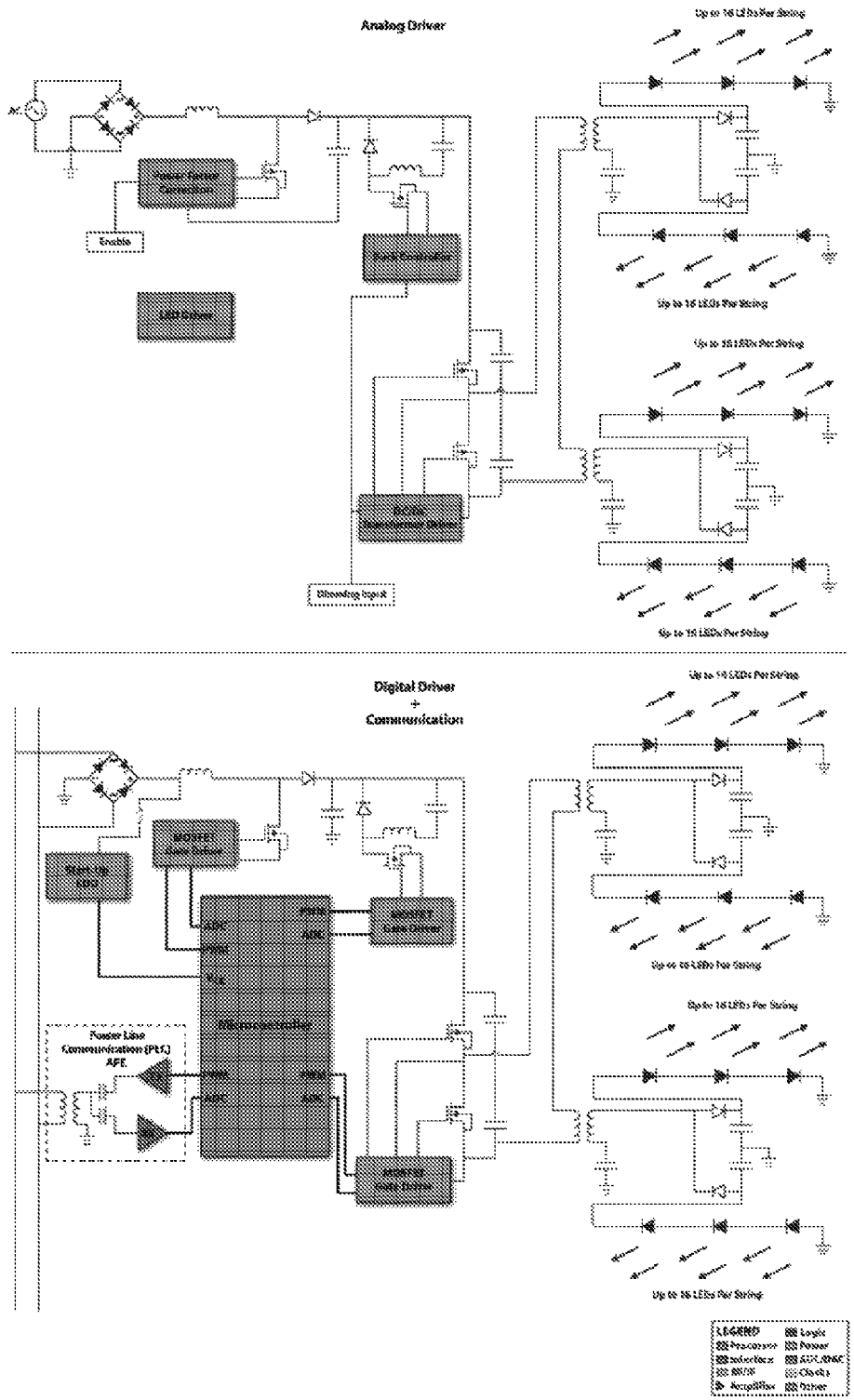
FIG. 4 shows various microcontroller embodiments with optical links.

FIG. 4 shows exemplary control electronics for the LED lighting and optical communication. The processor provides intelligent lighting which is the ability to reduce the amount of light and/or energy used so that only the right amount of light is delivered exactly where it is needed. Digitally controlled lighting using microcontrollers (MCUs) take advantage of the unique characteristics of LEDs and other light sources to develop efficient, scalable and flexible designs for intelligent lighting. With digital control, hardware features, such as soft startup, delay and PWM phase shifting, can be implemented in software, eliminating extra components, cost and complexity. The processor has communications and control solutions that can handle wired and wireless systems, supporting a wide selection of communication standards.

In one embodiment, an optical data communications receiver receives data encoded using optical pulse position. The receiver can include an optical signal reception device; a reference signal memory for storing a reference channel response signal; and a correlator coupled to the reference signal memory and to the optical signal reception device for correlating a received optical pulse with the stored reference channel response signal to determine the optical pulse position; and an output coupled to the correlator to provide pulse position data for the received optical pulse. The receiver can facilitate substantial reduction in the effect of multipath reflections, either in free space or in a "wired" connection such as a passive optical network (PON). Embodiments of the above described receiver are also useful in mitigating the effects of pulse smearing which arise in multimode optical fibres. Depending upon the receiving system in which the receiver is used the pulse position data may comprise hard decision data or soft data, for example for a Viterbi or similar channel decoding system.

In some preferred embodiments the receiver includes a reference signal acquisition system to determine a reference channel response signal from a received signal. This may, for example, detect a known training pattern in the header of a data packet and may optionally de-convolve this prior to storage. However in embodiments a digitised waveshape of a received reference signal is stored in the reference signal memory for correlation with the received signal, optionally oversampling around the expected location of a pulse.

Infrared data communications systems are generally point-to-point but, in embodiments, the reference signal memory stores a plurality of reference signals each corresponding to a different IR (infrared) transmitter, optionally a transmitter (transceiver) identifier being stored together with the reference signal. In this way a reference for a particular transmitter may be selected according to from which transmitter signals are being received and/or reference signals may be selected on a time-multiplexed basis.

In order to extract more energy from the received signal and to better mitigate the effects of multipath preferably the reference channel response signal comprises a plurality of multipath components. The environment in which the receiver is to operate may be known in advance, for example office, home, optical fiber network, or a user register may be provided for selecting an operating environment. In some environments multipath reflections may persist for a long period of time relative to the pulse duration (which may be less than 10 ns or less than 1 ns) and therefore, in embodiments, the reference signal memory has a data structure which allows a channel response signal to be defined as a plurality of multipath components each separated by a delay—for example pulse shapes for the separate multipath components separated by data indicating time intervals between the multipath components. A receiver controller may be provided to determine the reference signal data from the digitized received signal and to write this into the reference signal memory. It will be appreciated that in some environments the multipath components of one pulse might arrive after a direct path component of the next pulse—for example pulses may be transmitted at time intervals in the range 1 ns to 10 ns or 100 ns whereas multipath components of a transmitted pulse may continue to be received at a detectable level for longer time intervals. Preferably, therefore, the correlator includes storage for a partial correlation result in order to be able to re-use the correlator and thus correlate interleaved multipath components (which include the direct path component) by switching the correlator to accumulate partial correlation values for one pulse or the next depending upon the transmitted pulse to which a received pulse component belongs. Preferably such a receiver also includes a pattern generator to control the reference signal memory to provide such interleaved multipath components (of a stored reference signal) for correlation with interleaved multipath components of successively transmitted IR pulses. To facilitate rapid detection of what might be weak or very weak pulses preferably the correlator is configured to effectively implement multiple correlators in parallel over a transmission frame. In practice, as described further below, the expected pulse position is known, at least within a range, and thus the total effective number of correlators may be reduced.

Preferably, therefore, the correlator is configured to correlate, within a time window, a plurality of samples of the received optical pulse with a plurality of samples of the stored reference channel response signal. Thus, preferably, the reference channel response signal is stored in multiported memory to provide a plurality of successively delayed versions of the reference signal, preferably overlapping in time. Preferably a plurality of such correlators is implemented, coupled to the reference signal memory and to the signal reception device at a plurality of successive respective relative delays (between the received optical signal and the reference), to determine the position (in time) of an optical pulse.

In some particularly preferred embodiments a whitening function is employed to apply a pseudorandom pulse position modulation to a transmitted pulse, the receiver thus further comprising a pseudorandom sequence generator arranged so that it can be synchronized to the transmitter. Preferably the "whitening" modulation is greater than the (information) data modulation to facilitate decoding. The decoding process may efficiently be performed by locating one or more correlators at the expected position of a pulse as determined from the pseudorandom sequence, the precise position of the pulse determining the modulated (information) data.

Thus in a related aspect an optical data communications receiver for receiving data encoded using optical pulse position includes an optical signal reception device; a correlator coupled to the optical signal reception device for determining a received optical pulse position; an output coupled to the correlator to provide pulse position data for the received optical pulse; and wherein the optical pulse position is modulated by a pseudorandom sequence, the receiver further comprising a pseudorandom sequence generator for tracking the pseudorandom modulation.

In another aspect an optical data communications transmitter is used for transmitting data encoded using optical pulse position, the transmitter including a pseudorandom sequence generator for imposing a pseudorandom spreading code on the pulse positions encoding the data for transmitting.

The controller can run UWB encode/decode operations that include: inputting data to be transmitted; pulse position modulating the data onto an optical signal; sending the optical signal to an optical receiver; receiving the optical signal at the receiver; and demodulating the received optical data; and spreading the modulated pulse positions according to a pseudorandom sequence to reduce susceptibility of the communicated data to systematic noise.

The optical data communications system can include an output for data to be transmitted; a pulse position modulator for pulse position modulating the data onto an optical signal; an optical transmitter to transmit the optical signal; an optical receiver to receive the transmitted optical signal; and a demodulator for demodulating the received optical data to recover the transmitted data; and wherein the system further comprises a spreader for spreading the modulated pulse positions according to a pseudorandom sequence to reduce susceptibility of the communicated data to systematic noise. Whitening the transmitted data provides a number of advantages; importantly a reduction in the sensitivity of the receiver to internal or external systematic noise such as might arise from digital circuitry and/or fluorescent lighting. Preferably the receiver pseudorandom sequence generator is coupled to one or both of the reference signal memory and correlator for correlating the received optical pulse with the stored reference channel response signal at positions in time determined by the pseudorandom sequence. In embodiments the correlator (which may include multiple instances of correlation hardware and/or time-multiplexed hardware) correlates in two or more of these positions in parallel, preferably at least in positions corresponding to the two possible values of an encoded bit (here bit referring to a "raw" bit of data sent over the channel, and overall system typically including some form of channel encoding/decoding over this). For example, at, say, the 57th frame a bit may be expected at the 13th or at the 39th discrete time interval within the frame). Synchronization data for a pseudorandom sequence such as a sequence identifier and/or sequence seed may be provided to the receiver in an unwhitened packet header. It will be recognized that, in embodiments, one or both of the sequence identifier and sequence seed may be fixed or predetermined.

The optical data communications receiver can include a receiver front end including an optical signal reception device coupled to an analogue-to-digital (A/D) converter to digitize an optical signal received by the optical signal reception device; and a correlator coupled to the A/D converter to correlate the digitized received optical signal with a reference to decode the received optical signal. In order to operate a UWB-type receiver system with an optical signal reception device the front end is preferably configured to implement a peak detect function for the reception device. Thus whereas in a radio system the front end A/D is preferably centered on a mid-point of an input received waveform (for example by keeping statistics on maximum and minimum values and adjusting a DC offset to a zero/mid-position). In an optical system the A/D is run with an offset from zero so that the front end of the receiver in effect provides a peak-detect. More generally, the A/D converter has a non-linear conversion function so that the digital output value is a non-linear function of the analogue input. A multibit A/D converter may be employed but in some preferred embodiments a single bit A/D converter is used. In such a case the zero/one threshold may be displaced from a mid or zero-crossing position to implement the peak detect. Optionally the one (or more) bit sample may be squared to provide an energy detect function input to the UWB receiver processing. Optionally the receiver front end may also include a received signal level adjuster to adjust an input signal (level) to the analogue-to-digital converter, in particular in response to the reference channel response signal and/or statistics gathered on the received signal. In a further related aspect, therefore, the invention provides an optical data communications receiver, the receiver comprising: an optical signal reception device having an output; and a UWB receiver system coupled to the output of the optical signal reception device. Transmitters, receivers and corresponding methods as described above may advantageously be employed in free space optical communications such as in-room infrared broadcast communications and in passive optical networks, for example point-to-multipoint (PONs).

In an optical communications system based upon a multi-band-type UWB receiver one or more optical channels may be defined using one or more OFDM bands. An optical mesh network can be used with the light bulbs or light tubes. A plurality of optical transceivers can be used where each the transceiver includes an optical data communications transmitter configured to modulate data to be transmitted onto an optical output of the transceiver and an optical data communications receiver configured to receive an optical signal and to demodulate the received signal to recover transmitted data, and wherein transmitter is configured to spread the transmitted data using a pseudorandom sequence, and wherein the receiver in configured to despread the received optical signal to recover the transmitted data.

In embodiments of the network when one transceiver is out of range of another communication takes place via one or more intermediary transceivers. Thus preferably a transceiver includes a controller for automatically establishing a link with another transceiver. Preferably, therefore, a routing table is stored linking incoming data on one channel with outgoing data on a second channel so that each transceiver need only be locally aware of a next transceiver (or destination) to which data should be sent. Preferably this routing table stores an identifier that uniquely identifies a path through the network to a destination for a data packet. When a transceiver initially connects to the network a unique identifier such as a device name and/or address may be broadcast to other transceivers (nodes) within range for configuration of a local routing table, and forwarded by these nodes to other nodes within the network to make the network (transceivers) generally aware of the new connection. Dormant connections in the routing table may be effectively deleted after a dormant time interval has elapsed. A channel may be used for bi-directional, for example half-duplex communication or separate channels may be used for forward and reverse connections between pairs of nodes.

Free space optical data transmissions is not necessarily limited to line-of-sight communications, particularly when embodiments of the above described technique are employed to provide sensitive detection of noisy optical pulses and/or pulses in the presence of background noise. However, in some environments such as home environments with optically opaque partition walls, it is desirable to be able to provide an alternative communications technique which is similarly capable of operating at very high data rates. To solve this issue, the light bulb or tube can include a dual-capability transceiver system for networking, the transceiver having dual optical/UWB data communication capability, the transceiver including: an interface for optical emitter/detector; an interface for rf emitter/detector; and a UWB signal processor coupled to the rf emitter/detector interface for sending and receiving radio frequency (rf) UWB transmissions and having UWB signal processing hardware for processing received UWB transmissions to retrieve communicated data; and wherein the optical emitter/detector interface shares at least a portion of the UWB signal processing hardware for processing received optical transmissions to retrieve optically communicated data. By providing both high speed optical and high speed UWB communications links embodiments of the device may have greater flexibility. In embodiments sharing the UWB signal processing hardware enables high speed data communications over both optical and UWB links, for example in excess of 100 Mbps, 500 Mbps or 1 Gbps. The optical emitter/detector may comprise, for example, a laser diode and a pin or avalanche diode detector; the rf emitter/detector may comprise a simple rf antenna or a near-field coupling device as described, for example, in the applicant's GB0428046.7 of 22 Dec. 2004, and related applications. In embodiments, depending upon the optical emitter/detector employed and upon any optional interfaced circuitry used, a common interface may be provided for optical and rf communications. An infrared channel can provide a secure method for sending a security key to a UWB receiver, as described in US 2004/0264701, the content of which is incorporated by reference.

In all of the above described receivers, transmitters, methods and network the optical signal is not restricted to visible wavelengths and, in particular, preferred embodiments employ infrared (IR) signals, typically at wavelengths longer than 700 nm, for free space transmissions avoiding water absorption regions and for fiber transmissions generally (but not necessarily) in a fiber telecommunications band such as O, E, S, C, L or U-band (approximately 1200 nm to 1700 nm). In embodiments of the above described receivers, transmitters, networks, methods and transceivers the communicated optical data can reach a rate of more than 100 Mbps, preferably more than 500 Mbps or 1 Gbps.

A block diagram an electrical schematic of a communications network is discussed next. Incoming/Outgoing BPL communication 3201 is provided through a wire from a remote BPL transceiver. This is the shared electrical circuit. A Broadband-over-Power-Line (BPL) transceiver 3202 is provided to receive and transmit data from/to the BPL enabled electrical circuit. The particular interface implemented may vary. Currently a number of existing interfaces could be used, such as Universal Serial Bus (USB), Ethernet, Media Independent Interface (MII), etc, and the particular choice of interface could further depend on the BPL transceiver used, as will be apparent to those skilled in the art.

A micro-controller, microprocessor, ASIC or the like 3203 is provided for program control that can transmit/receive data to/from BPL communication network 3201 through BPL transceiver 3202. Microprocessor 3203 in an embodiment may respond to commands received on this network 3201 to manipulate enable circuitry 3204, and may also issue commands or send data to network 3201 if needed. If the transmit portion of enable circuitry 3204 is enabled, these commands/data will also be passed to the optical link.

Enable circuitry 3204, through driver circuitry 3205, may in one embodiment be enabled to turn on or off the LED optical transmitters 3102, 3104, as well as change the characteristics of the light, such as brightness and even color mix when multicolor LEDs are used. This is useful for things such as an annunciator light or emergency light, which may provide a visual indicator for things such as tornado, lock-down, fire, movement, etc. Enable circuitry 3204 may also manipulate the ability for BPL communication network 3201 to send and/or receive data at this clock to or from the optical link.

Driver circuitry 3205 and LED(s) 3206 will pass any signals to the optical link for other devices. Driver circuitry 3205 may, in the preferred embodiment, simply be appropriate buffering, isolation, modulation or amplification circuitry which will provide appropriate voltage and power to adequately drive LED emitter 3206 into producing a visible light transmission. Exemplary of common driver circuits are operational amplifiers (Op-amps) and transistor amplifiers, though those skilled in the art of signal conditioning will recognize many optional circuits and components which might optionally be used in conjunction with the present invention. Also, it may be desirable to use a modulation scheme with the signal. The transmit circuitry may have to provide a means of modulation in this case, also preferably incorporated into driver circuitry 3205. The type of modulation will be decided using known considerations at the time of design, selected for exemplary purposes from FM, AM, PPM, PDM, PWM, OFDM, and QAM.

Similar to but preferably complementary with the transmission circuitry, receiver circuitry 3207 receives data from the optical link detected by photo sensor 3208. Receiver circuitry 3207 will appropriately condition, and may further convert a data-bearing electrical signal. As but one example of such conversion, receiver circuitry 3207 may additionally demodulate a data-bearing electrical signal, if the data stream has been modulated by an optical host. Suitable buffering, amplification and other conditioning may be provided to yield a received data signal.

In one embodiment, LED 3206 may be illuminated as a night light at low power. Where properly enabled with battery back-up or the like, the preferred embodiment communications such as illustrated in the Figures may further provide communications and emergency lighting in the event of a power failure.

In an embodiment of the invention, an intelligent audio/visual observation and identification database system may also be coupled to sensors as disposed about a building, relying upon the present communications system transmitting over the synchronization wire of a clock system. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED optical transmitters and optical detectors, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

The optical link does not interfere with existing communication systems like those that are common today. Consequently, the preferred embodiment may be used in a variety of applications where prior art systems were simply unable due to EMI/RFI considerations.

Set-up, testing, troubleshooting and the like are also vastly simplified. When the light communication system is working, the user can actually see the illumination. If an object interferes with light transmission, the user will again immediately recognize the same. Thus, the ease and convenience of this light system adds up to greater mobility and less cost. In addition, relatively high energy outputs may be provided where desired using the preferred visible light communications channel, since the human eye is adapted and well-protected against damage from light. In contrast, many invisible transmission techniques such as Ultraviolet (UV) or Infra-Red (IR) systems have much potential for harm.

A host lamp fixture system may replace stationary (mounted in a particular place) lighting fixtures in order to communicate data. Inside of LED lights there may be one or many dies; these may pulsate on slightly different frequencies from a single light to communicate. Each may be looking for changes by way of Multiple Channel Access or other suitable technique.

The LED signal light can provide systematic information transfer through encrypted pulsed light (hereinafter SIT-TEL) communication system which may be depicted in several embodiments. Any reference to a SIT-TEL communication herein is perceived to be equivalent to, and/or the same as, a general reference to pulsed light communication. In general, the signal light and SIT-TEL pulsed light communication system may be formed of a single row, single source, or an array of light emitting diode light sources configured on a light support and in electrical communication with a controller and a power supply, battery, or other electrical source. The signal light and SIT-TEL pulsed light communication system may provide various light signals, colored light signals, or combination or patterns of light signals for use in association with the communication of information. These light signals may also be encoded. Additionally, the signal light and SIT-TEL pulsed light communication system may be capable of displaying symbols, characters, or arrows. Rotating and oscillating light signals may be produced by sequentially illuminating columns of LEDs on a stationary light support in combination with the provision of variable light intensity from the controller. However, the signal light and SIT-TEL pulsed light communication system may also be rotated or oscillated via mechanical means. The signal light and SIT-TEL pulsed light communication system may also be easily transportable and may be conveniently connected to a stand such as a tripod for electrical coupling to a power supply, battery, or other electrical source as a remote stand-alone signaling or communication device.

The signal light and SIT-TEL pulsed light communication system may be electrically coupled to a controller used to modulate, pulse, or encode, the light generated from the light sources to provide for various patterns or types of illumination to transmit messages.

Individual light supports as a portion of the SIT-TEL communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LEDs, to regulate or modulate the light intensity for the LED light sources. The individual LEDs and/or arrays of LEDs may be used for transmission of communication packets formed of light signals.

The controller for the LED light support may generate and/or recognize pulsed light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

In one communications application, two unsynchronized transceivers phase-lock to each other and exchange pulse-width-modulated data bi-directionally. In this protocol, the two receivers take turns to operate in transmit and receive mode, and a relatively short light pulse indicates a 0 or space state, and a relatively long light pulse indicates a 1 or mark state. This protocol starts in an idle cycle with the transceiver performing an idling cycle. In the idle cycle, the transceiver transmits a one millisecond light pulse followed by a four millisecond receive period. During the receive period, the transceiver executes multiple light measurements. These light measurements provide only a one bit of resolution, i.e., whether the incoming light flux is above or below a predetermined threshold, nominally about 1.5V. The idling cycle continues until at least two measurement times in succession indicate "light seen." At this point, the transceiver assumes an incoming pulse of light from another transceiver has been detected, and shifts from the idling loop to a slightly faster synchronizing loop. During the synchronizing loop, the transmitted light pulse is still one millisecond ON, but followed by a variable number of light measurements. When in the synchronizing loop, the microprocessor terminates the measurement set after either a predetermined number of measurements, or when the trailing edge of a light pulse is detected. A trailing edge is considered to be found when a pair of back-to-back measurements both indicate "light seen" followed by ten measurements without "light seen." The execution pattern inside the synchronize loop is therefore composed of one transceiver's LED on for one millisecond, then a one millisecond period with both LEDs off, followed by the other transceiver's LED on for one millisecond, and finally both LEDs off for one millisecond. Even if the transceivers have clock frequency errors of up to 25%, they will still be able to synchronize. The nominal synchronize loop pulse rate is 250 Hz, with a 25% duty cycle. During communication, data bits are transmitted in asynchronous form. For example, a one millisecond light pulse, indicates a MARK and a 0.5 millisecond light pulse indicates a SPACE. The system normally idles with MARK bits being transmitted. Here, the operation of the data transfer loop is the same as the synchronize loop. During data transmission, the format is at least 16 MARK bits to allow synchronization, then a single SPACE as a start bit, followed by eight bits of data, followed by one MARK as a stop bit. This is similar to the common 8-N-1 RS-232 format. To decode the light pulses, the receiving transceiver keeps a count of "light seen" measurements for each execution of the synchronize loop. If seven or fewer light-seen measurements are counted, then a SPACE is recorded; if eight or more pulses are counted, then a MARK is recorded. The usual asynchronous deframing, i.e., dropping the leading SPACE start bit and the trailing MARK stop bit, can be performed. The resulting 8-bit data word is then available to the application-level program. Simple data communications can also be combined with error correction and encryption. Other optical communications protocols are also possible.

In some applications, the peer-to-peer ability to transfer information or authorization is desirable. In other applications, such as financial and other secure transactions, authentication is as important as the data transfer itself, and the uncontrolled passing of authority must be prevented. An unfortunate side effect of the programmable nature of the transceiver is that there is no guarantee that another transceiver will respect any "do not forward" data tags that may be inserted by an application. Non-transferable authorization and unforgeable proof-of-identity are difficult problems with many subtleties. However, simple cryptography is possible and can be used to keep the transceivers transactions secure from eavesdropping and spoofing. The microprocessor used has sufficient power to implement common symmetric cryptographic algorithms. These require the transmitter and receiver to share a secret key so communication between any two transceivers is configured in advance. The transceiver can be equipped with sufficient memory to hold many symmetric encryption keys and can therefore be set up to communicate with a large number of other transceivers. Zero-knowledge proofs (ZKP) and public-key (or asymmetric) cryptography enable the transceiver to securely prove its identity and communicate with any transceiver that had access to published information, see Schneier, "Applied Cryptography," 2nd edition, John Wiley and Sons, New York, N.Y., 1996, pp. 101-111. No shared secrets are necessary.

Figure 5:
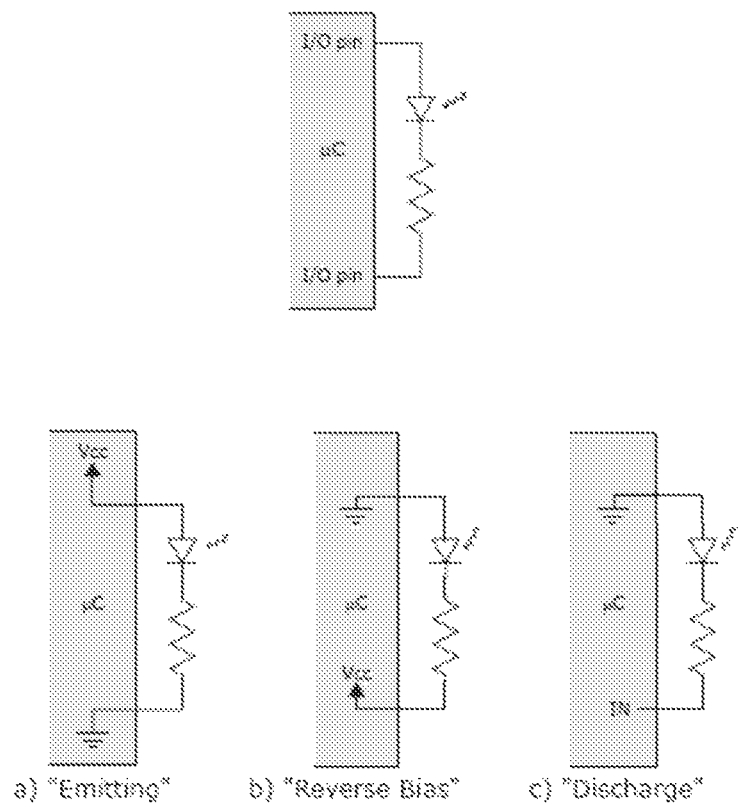
FIG. 5 shows an exemplary LED transceiver.

FIG. 5A-5C show an exemplary LED ambient light sensors. The LED is a photodiode that is sensitive to light at and above the wavelength that which it emits (barring any filtering effects of a colored plastic package). Under reverse bias conditions, a simple model for the LED is a capacitor in parallel with a current source which models the optically induced photocurrent. The system measures the photocurrent. One way to make a photodetector out of an LED is to tie the anode to ground and connect the cathode to a CMOS I/O pin driven high. This reverse biases the diode, and charges the capacitance. Next switch the I/O pin to input mode, which allows the photocurrent to discharge the capacitance down to the digital input threshold. By timing how long this takes, the photocurrent can be measure to determine the amount of incident light. The microprocessor interface technique uses one additional digital I/O pin, but no other additional components compared to those need to simply light the LED. Since the circuit draws only microwatts of power, it has a minimal impact on battery life.

In one embodiment, the LED blinks very fast, and then ambient light is detected when the LED is off. The LED is connected to general IO port GP0 with a resistor between the LED and GP1. When GP0 is high, and GP1 is low, will it conduct, and emit light. When the GP0 is low, and GP1 is high, then the LED is off. The LED is charged to −5V across it, and when the GP1 turns into tri-state and goes low, and the time depends on capacity and on current in LED. A 16-bit Sigma Delta ADC is used to detect the voltage output of the LED when it is off. The voltage output is proportional to the amount of light in the room and can be used to turn on/off room lighting or other peripherals.

FIG. 5A shows the "Emitting" mode where current is driven in the forward direction, lighting the LED. FIG. 6B shows "Reverse Bias" mode, which charges the capacitance and prepares the system for measurement. The actual measurement is made in "Discharge" mode shown in FIG. 5C. Since the current flowing into a CMOS input is extremely small, the low value current limiting resistor has little impact on the voltage seen at the input pin. The system times how long it takes for the photocurrent to discharge the capacitance to the pin's digital input threshold. The result is a simple circuit that can switch between emitting and receiving light. Because the circuit changes required to provide this bidirectional communication feature consist of only one additional I/O pin, adding the light sensor is essentially free.

In one embodiment, a TI MSP430F20x3 microcontroller is used to drive an LED. The LED is used both as an indicator or night light and an ambient room light sensor. The voltage generated by the LED is measured using a built-in 16 bit sigma delta converter. A LED voltage reading is obtained every 200 ms. Based on predefined "Min" and "Max" reference values, the active duty cycle for lighting ballasts is adjusted according to the current light conditions. The darker the ambient light is, the more the ballasts will be set so that room will be illuminated. The microcontroller/LED is exposed to darkness for a short moment in order to calibrate the LED's offset voltage. A very low frequency oscillator (VLO) is used to clock a timer which is used for both PWM generation to adjust LED brightness but also to derive the timings. A calibration process can be implemented to accommodate for variations in VLO frequency.

Figure 6:
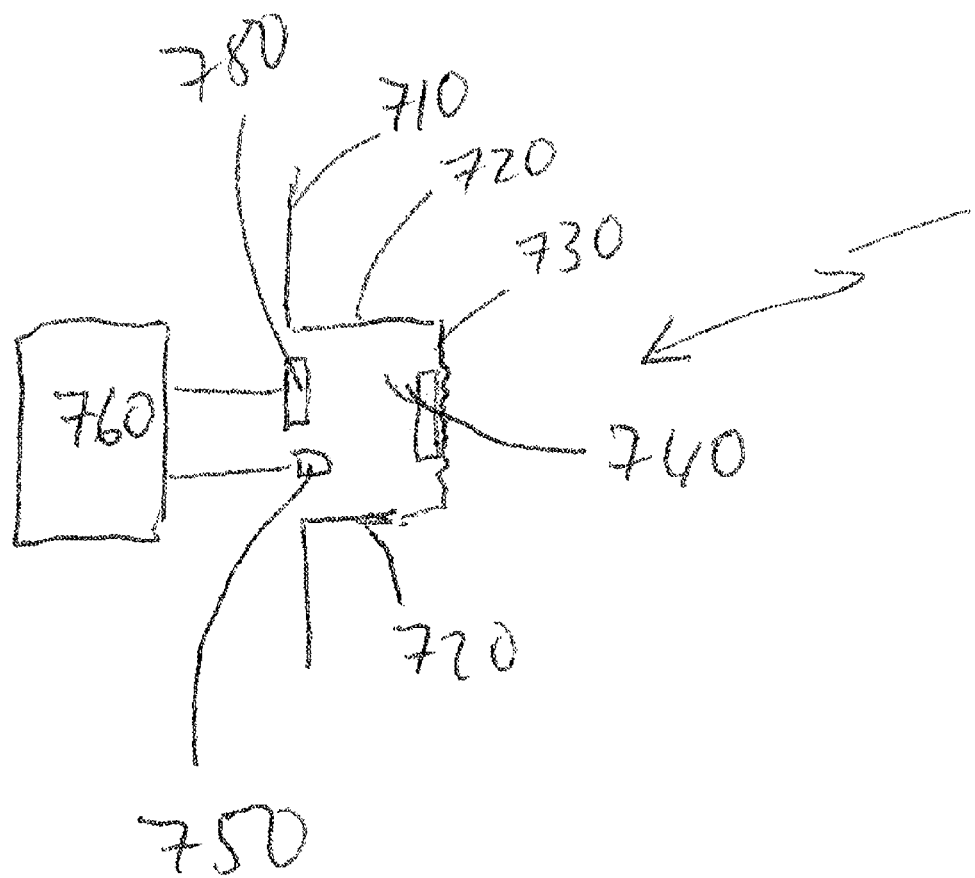
FIG. 6 shows an exemplary LED sound transducer.

Although a conventional microphone can be used, a low cost LED sensor with a reflective foil can be used to use sound. FIG. 6 shows an exemplary LED based microphone to detect sound or noise in the room. In this embodiment, a base surface 710 supports a cylinder that protrudes from the base surface using legs or posts 720. At one end, a flexible membrane 730 is positioned to pick up sound and to vibrate according to noise or sound in the room. A piece of light-reflecting metal foil 740 is positioned on one end. Speech or sound vibrates the foil 740. An LED 750 is directed at the foil 740 and the vibration is reflected off the foil on to the same LED 750 acting as a photocell. Sound is thus captured by the LED 750 and processed by low power a microcontroller 760. The microcontroller 760 is connected to an antenna 780. Radio reflections from occupants in the room cause changes in the RSSI signal which is captured and processed by the controller 780 for occupancy sensing. To aid the LED receiver in detecting the signal, the light source should be pulsed at the highest possible power level. To produce the highest possible light pulse intensity without burning up the LED, a low duty cycle drive must be employed. This can be accomplished by driving the LED with high peak currents with the shortest possible pulse widths and with the lowest practical pulse repetition rate. For standard voice systems, the transmitter circuit can be pulsed at the rate of about 10,000 pulses per second as long as the LED pulse width is less than about 1 microsecond. Such a driving scheme yields a duty cycle (pulse width vs. time between pulses) of less than 1%. However, if the optical transmitter is to be used to deliver only an on/off control signal, then a much lower pulse rate frequency can be used. If a pulse repetition rate of only 50 pps were used, it would be possible to transmit the control message with duty cycle of only 0.005%. Thus, with a 0.005% duty cycle, even if the LED is pulsed to 7 amps the average current would only be about 300 ua. Even lower average current levels are possible with simple on/off control transmitters, if short multi-pulse bursts are used. To obtain the maximum efficiency, the LED should be driven with low loss transistors. Power field effect transistors (FET) can be used to efficiently switch the required high current pulses.

In one embodiment, the LED microphone can be used with the occupancy sensor or detector, providing an ideal solution for areas with obstructions like bathrooms with stalls or open office cubicle areas. This embodiment first detects motion using the wireless radar system and then engages the LED microphone to listen for continued occupancy. The system can tune the sound detection to sudden noise changes only and filters out the background "white" noise.

In another embodiment, the LED microphone can be used with the LED ambient light detector or sunlight sensor/detector. This embodiment first detects ambient room light condition using the LED light sensor and then engages the LED microphone to listen for continued occupancy. The system can tune the sound detection to sudden noise changes only and filters out the background "white" noise.

In another embodiment, the LED microphone can be used with the LED light detector and the LED occupancy sensor or detector. This embodiment first detects if sufficient light exists, then detects people's motion using the wireless radar system and then engages the LED microphone to listen for continued occupancy. The system can tune the sound detection to sudden noise changes only and filters out the background "white" noise.

In yet other embodiments, the clock kept by the microcontroller can be used to supplement the turn on or off of lighting or power other devices in the room. The microcontroller can communicate with a ballast. The ballast is the unit in a fluorescent lighting system that provides power to the fluorescent tube at the proper frequency. Located in the lamp's housing, it is a featureless metal box containing electronic circuitry. Dimmable ballasts are an advanced design that allow lights to be tuned continuously from full brightness to a very low level (usually about five percent of total brightness), to save electricity when less light is needed or to reduce lighting glare.

The system can detect light, sound and people present to provide an accurate determination of occupancy and such determination can be used to effectively provide environmental comforts for the occupants. One exemplary process for room environmental control is as follows:

Check clock to see user specified appliance on-off period is met and if so, turn appliance on or off
Check room light to see if room light is below threshold and if so
Check room microphone to see if people are present and if so
Check occupancy sensing radar to sense motion in the room, and if so, turn on one or more appliances such as lighting and display terminals in the room.
Check room temperature and turn on AC if needed.

A user override button is provided so that the user can manually force the room to turn on appliances as desired.

Figure 7:
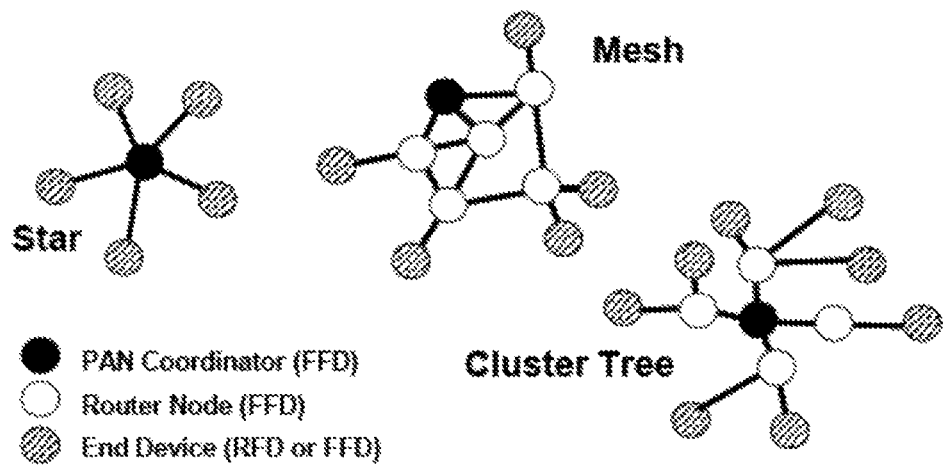
FIG. 7 shows an exemplary mesh network.
Figure 8:
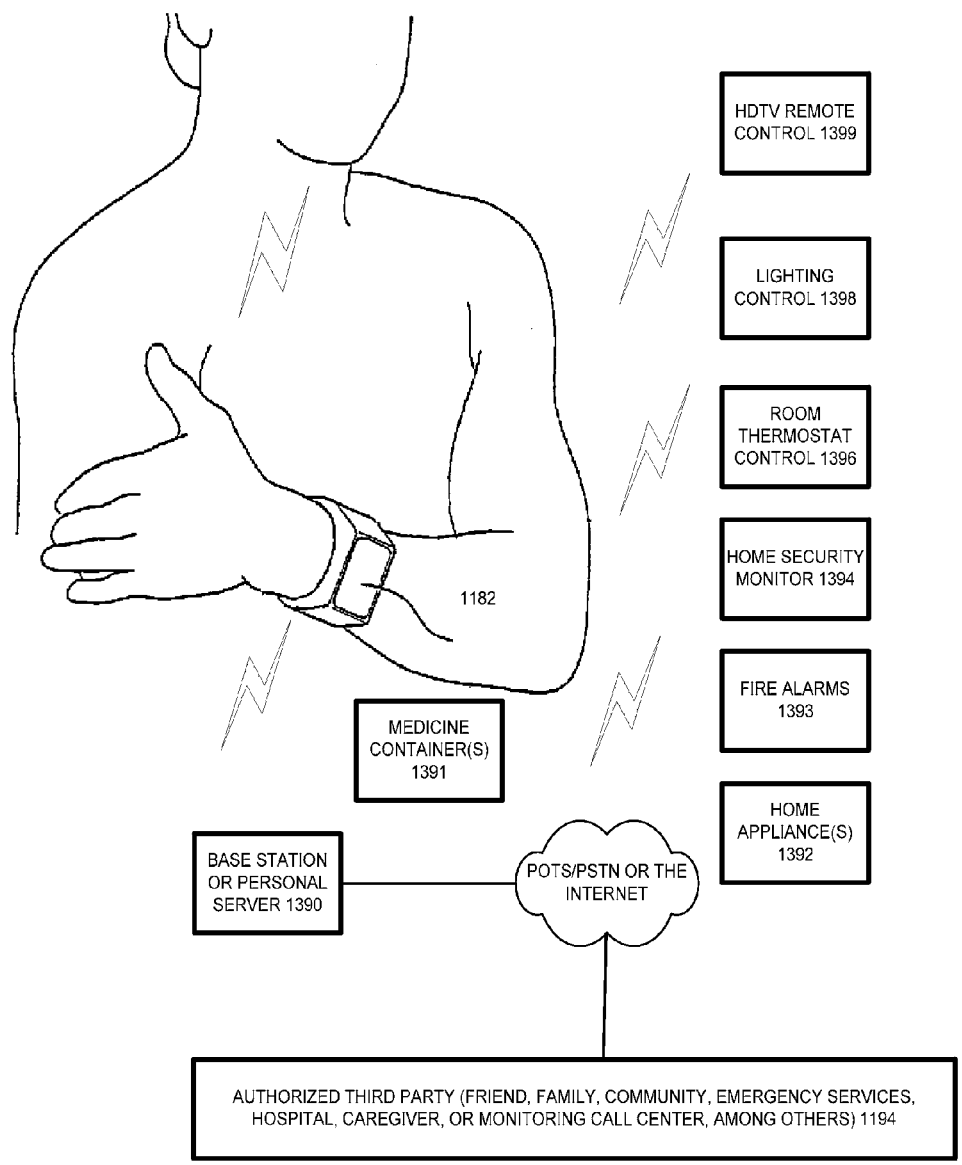
FIG. 8 shows an exemplary home control and monitoring system for the optical network.

FIGS. 7-8 show exemplary optical mesh networks that communicate over optical frequencies, and is compatible with the Zigbee protocol in one embodiment. Another embodiment is compatible with WiFi. Yet another embodiment is compatible with IEEE 802 protocols. Data collected and communicated on the display 1382 of the watch as well as voice is transmitted to a base station 1390 for communicating over the optical communication network to an authorized party 1394. The watch and the base station is part of a mesh optical network that may communicate with a medicine cabinet to detect opening or to each medicine container 1391 to detect medication compliance. Other devices include mesh network thermometers, scales, or exercise devices. The mesh network also includes a plurality of home/room appliances 1392-1399. The ability to transmit voice is useful in the case the patient has fallen down and cannot walk to the base station 1390 to request help. Hence, in one embodiment, the watch captures voice from the user and transmits the voice over the optical mesh network to the base station 1390. The base station 1390 in turn dials out to an authorized third party to allow voice communication and at the same time transmits the collected patient vital parameter data and identifying information so that help can be dispatched quickly, efficiently and error-free. In one embodiment, the base station 1390 is a POTS telephone base station connected to the wired phone network. In a second embodiment, the base station 1390 can be a cellular telephone connected to a cellular network for voice and data transmission. In a third embodiment, the base station 1390 can be an optical network, or a ZigBee, WiMAX or 802.16 standard base station that can communicate VOIP and data over a wide area network. In one implementation, Zigbee or 802.15 appliances communicate locally and then transmits to the wide area network (WAN) such as the Internet over WiFi or WiMAX. Alternatively, the base station can communicate with the WAN over POTS and a wireless network such as cellular or WiMAX or both.

Because optical illumination is constrained by opaque objects such as walls, the location of an associated device or person can be discerned to a particular room, hallway or other similar space. In contrast, conventional GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, therefore has much more exact pinpointing than hitherto available. It can locate a person immediately, even in a large area and/or among a large crowd, and can keep track of a large population simultaneously. The large bandwidth permits video signals to be integrated, providing the opportunity to create audio-video records that are fixed in time and location.

Since location may be relatively precisely discerned, optical transmitter LEDs may in one embodiment be configured to change color, flash, or otherwise be visually changed or manipulated to assist with directional guidance, personnel or intruder identification, energy management, or even to facilitate the meeting and connection of individuals.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical, electro-mechanical or electrically controllable devices.

The system can be used to energy efficient control of appliances such as lighting or cooling/heating devices that use energy consumption in a room. The wireless mesh network 22 allows for continuous connections and reconfiguration around blocked paths by hopping from node to node until a connection can be established, the mesh network including one or more wireless area network transceivers 10 adapted to communicate data with the wireless mesh network, the transceiver detecting motion by analyzing reflected wireless signal strength. The appliance is coupled to the transceiver and the appliance is activated or deactivated in response to sensed motion in the room based on the reflected wireless signal strength. For example, if the sensor 12 senses no motion over a period of time, the system turns off non-essential appliances such as the lights and the fan in the room and changes the temperate setting to the lowest cost configuration.

Because each individual emits patterns that are unique to the user, the system can automatically recognize the individuals based on his or her emitted pattern. A recognizer can receive user identifiable characteristics from the transceiver. The recognizer can be a Hidden Markov Model (HMM) recognizer, a dynamic time warp (DTW) recognizer, a neural network, a fuzzy logic engine, or a Bayesian network recognizer, among others.

The recognizer can monitor one or more personally identifiable signatures. For example, the transceiver identifies one person from another based on a heart rate signature as measured by a Doppler radar. A sound transducer such as a microphone and/or a speaker can be connected to the wireless transceiver to communicate audio over a telephone network through the mesh network. A call center or a remote receptionist can be linked to the transceiver to provide a human response. An indoor positioning using triangulation or RSSI-based pattern matching can communicate with one or more mesh network appliances to provide location information. A web server can communicate over the mesh network and to a telephone network to provide information to an authorized remote user. A wireless router can be coupled to the mesh network and wherein the wireless router comprises one of: 802.11 router, 802.16 router, WiFi router, WiMAX router, Bluetooth router, X10 router.

The optical mesh network appliance can be connected to a power line to communicate data to and from the mesh network. A smart meter can relay data to a utility over the power line and the mesh network to the appliance. The smart meter includes bi-directional communication, power measurement and management capability, software-controllable disconnect switch, and communication over low voltage power line. A remote processor that can remotely turn power on or off to a customer, read usage information from a meter, detect a service outage, detect the unauthorized use of electricity, change the maximum amount of electricity that a customer can demand at any time; and remotely change the meters billing plan from credit to prepay as well as from flat-rate to multi-tariff. The appliance minimizes operating cost by shifting energy use to an off-peak period in response to utility pricing that varies energy cost by time of day. A rechargeable energy reservoir such as a fuel cell or a battery can supply energy to the appliance, and the reservoir is charged during a utility off-peak period and used during a utility peak pricing period. Solar panels, wind mill, or other sources of renewable energy can be provided outside the premises to generate local energy that recharges the reservoir or store energy in the utility grid.

The appliance's operation is customized to each individual's preference since the system can identify each individual through his or her heart rate signature, among others. Each user can set his or her preferences and the system can detect the user's entry into a room and automatically customizes the room to the user. For example, upon entry into a room, the network can stream the user's preferred music into a music player in the room or alternatively can stream his or her favorite TV shows and display on a screen for the user. Also, lighting level and temperature can be customized to the user's preferences. The bed setting can be customized to reflect the user's preference for a soft or hard mattress setting. The chair height, tilt/reclination and firmness can be adjusted to the user's preference. The window transparency or tint can be automatically set to the user's preferred room brightness. Phone calls can automatically be routed to the user's current position. If there are many people in the room, the appliance's operation is customized to a plurality of individuals in a room by clusterizing all preferences and determining a best fit preference from all preferences.

In one embodiment, the system can be set to provide Occupancy Sensor Time Delays, Switch Operation (Manual/Automatic On), Enable/Disable Microphone Occupancy Sensor/Door Sensor/Other Sensor, Custom Device Names, Photocell Setup & Control, 2-Pole Device Settings, Dimming Limits, Remote Firmware Upgrades. The system can also Override Lights ON/OFF, Scheduled ON/OFF, Auto-ON/OFF with Occupancy, Manual ON/OFF via Local Switch, Auto-Dim via LED Sensing, Auto-ON/OFF via LED Sensing, Auto-ON/OFF with Astronomical Clock, Increase Dim Level Decrease Dim Level. The system can also schedule (date/hour/minute) changes to any setting or control mode with convenient recurrence patterns: daily, weekly, weekdays, weekends, etc. Preset and Custom Device Groups selection enable quick programming of zones. The system also provides automatic Daylight Savings Adjustment.

Lobby
Auto-ON with first occupant
Permanent ON (no OFFs due to Vacancy) during working hours
Photocell overrides lights OFF during peak daylight
Return to occupancy-based control during non-working hours
Private Office
Custom time delays based on occupant requirements
Lumen maintenance through ceiling dimming photosensor
User-selected dim levels
Open Office
Requires first morning occupant to initiate Lights ON
Permanent ON status during working hours
Standard occupancy control during evening non-working hours
Short time delays during late night guard walk through
Restroom
2-Pole sensor controls light and fan separately
Light turns OFF shortly after vacancy; fan runs for extended time
Varying time delay periods for working vs. non-working hours in order to maintain lamp life while maximizing energy savings
Retail Floor
Occupancy control during early morning stocking hours
Lights are on Time-of-Day/Day-of-Week schedule during store hours
Occupancy control during evening cleaning hours
Occupancy sensors automatically accommodate special late night sales without reprogramming system
Classroom
System accommodates inboard/outboard switching (A/B)
Stepped dimming or continuous dimming with local setpoint control
Dual Technology (PDT) during class hours, single technology (PIR) and shortened time delays during cleaning periods
Parking Garage/Lot
Astronomical dawn and dusk times available
Photocell override during daylight hours
All lights extinguished during times when garage is closed In one embodiment, the mesh resembles a street grid, with wireless "streets" connecting at various intersections. Each intersection is a node on the network. Nodes serve two functions. They can transmit, receive, and interpret information. They can also function as repeaters, allowing information to hop from one node to the next en route to its destination. If one node fails, another optical repeater can reroute the signal through the mesh to the appropriate receiver. The optical networks are self-configuring. The sending node only needs to know the address of the receiving node. The data's exact route through the mesh meanders from node to node until it completes its journey. The networked mesh of optical nodes is called a personal area network (PAN). Each PAN operates independently of all others. Nodes within the PAN serve two purposes. The stack layer routes messages from an originating node to a receiving node. It is what allows nodes to function as repeaters, relaying data through the mesh. The application layer fulfills a function on the network. For example, a temperature sensor's function is to transmit temperature information to the building management system. Before it can function, each node must be associated with a PAN. This is accomplished through a multistage commissioning process. Each node has a unique IEEE 802 MAC address. Some are preprogrammed at the factory or by their installers to "know" the PAN to which they are intended to belong. If not, the newly installed node's first action is to search the mesh for a commissioning tool. The commissioning tool, often a laptop, identifies the node by its unique address, establishes a connection and programs it to belong to a given PAN. A second tool, residing on the same laptop, uploads application data. Once programmed, the node must find its PAN on the mesh. It issues a series of calls designed to locate a node designated as the coordinator. Only one coordinator exists on each PAN. Once the new node and coordinator find and recognize one another, a connection is established. The optical network is capable of transmitting encrypted data for added security. Security-enabled PANs have an additional node designated as the trust center. When the new node joins the PAN, the trust center determines whether it has permission to send and receive encrypted messages. If so, it programs the node with security policies such as whether the encryption key will be fixed or dynamic.

In one embodiment, the system tunnels BACnet data over the optical network. Once the optical node finds and connects to its PAN, it must find the subset of nodes that form its BACnet network. It does this in three ways: with a broadcast, multicast, or unicast call. A broadcast call goes out to the entire PAN. Each node within the PAN receives the message, interprets the message, and replies with whether or not it belongs to the appropriate BACnet network. Although broadcast calls are programmatically simple to make, they place undue stress on the optical network, consuming bandwidth and forcing every node on the PAN to read and interpret the message. A multicast call is preferable in most cases. Here, a group of nodes is predefined as belonging to the BACnet network. Nodes not belonging to this predefined set can quickly reject the call without receiving and interpreting much data. Because this process consumes less bandwidth, it is preferable for larger networks. For a unicast to work, the new node must be programmed to connect with one predefined node on the BACnet network. The node pings every other node in the PAN until it finds the appropriate BACnet node. The process conserves bandwidth but takes longer. Once all optical nodes locate and associate themselves with their assigned BACnet networks, they establish a pipeline for data transmission. A series of calls is placed to determine how data will flow through the pipeline. The process refines rate, speed, and other parameters to ensure the most efficient flow of information. The integrated BACnet and optical network is fully configured after the commissioning process is complete. Data travels on the optical network much the same as it would on a wired network. Neither the light network nor BACnet restricts the size of messages. Both technologies can accommodate any size message by chopping it into packets. This ability is called segmentation in BACnet and fragmentation in other networks.

In one embodiment, the optical network complies with Zigbee protocol and BacNet 135-2008q-3 which defines the use of ZigBee as a BACnet data link layer. In another embodiment, the BACnet data link layer directly supports the optical network protocol.

Figure 9:
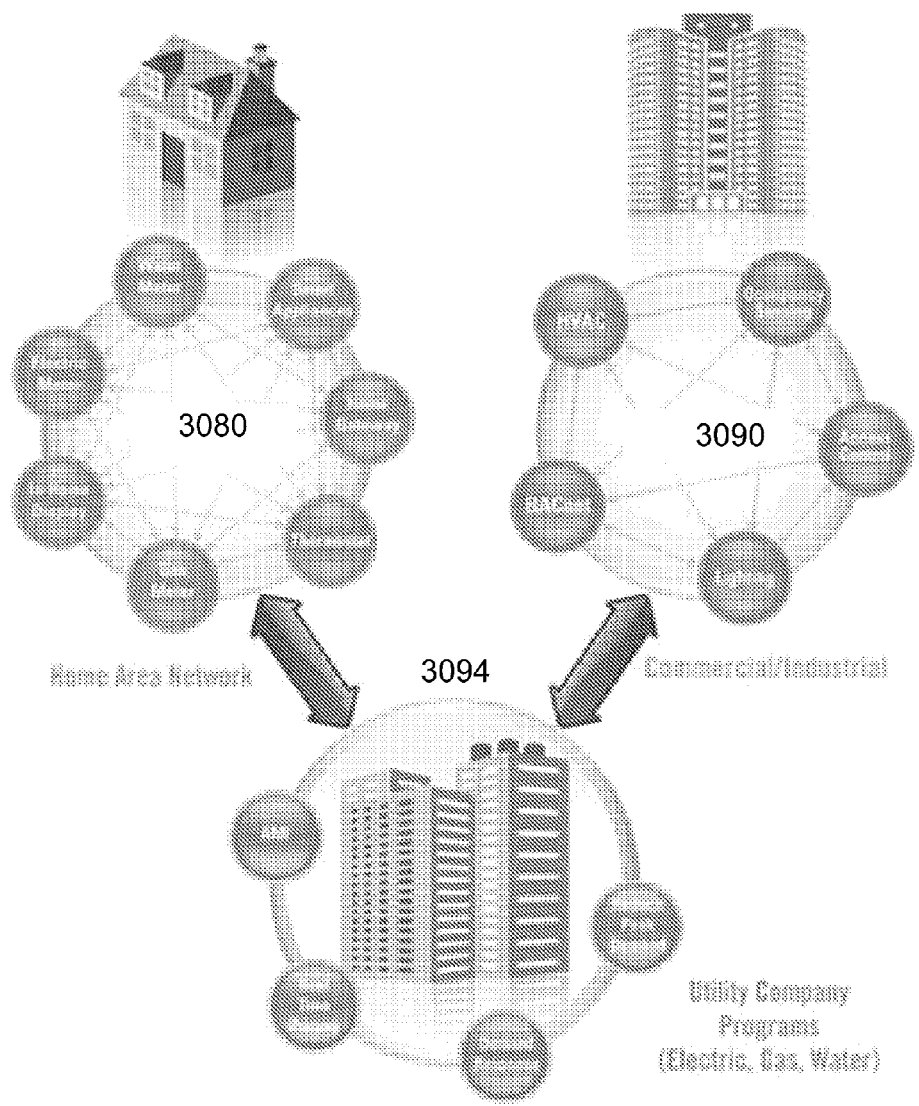
FIG. 9 shows an exemplary smart grid.

FIG. 9 shows an exemplary smart grid with optical home area network 3080, optical commercial industrial building network 3090 and utility 3094. In one embodiment, the controller receives time-based pricing from the utility 3094. Time-based pricing refers to a type offer or contract by a provider of a service or supplier of a commodity, in which the price depends on the time when the service is provided or the commodity is delivered. The rational background of time-based pricing is expected or observed change of the supply and demand balance during time. Time-based pricing includes fixed time-of use rates for electricity and public transport, dynamic pricing reflecting current supply-demand situation or differentiated offers for delivery of a commodity depending on the date of delivery (futures contract). Most often time-based pricing refers to a specific practice of a supplier.

Time-based pricing of services such as provision of electric power includes
- time-of-use pricing (TOU pricing), whereby electricity prices are set for a specific time period on an advance or forward basis, typically not changing more often than twice a year. Prices paid for energy consumed during these periods are preestablished and known to consumers in advance, allowing them to vary their usage in response to such prices and manage their energy costs by shifting usage to a lower cost period or reducing their consumption overall;
- critical peak pricing whereby time-of-use prices are in effect except for certain peak days, when prices may reflect the costs of generating and/or purchasing electricity at the wholesale level
- real-time pricing (also: dynamic pricing) whereby electricity prices may change as often as hourly (exceptionally more often). Price signal is provided to the user on an advanced or forward basis, reflecting the utility's cost of generating and/or purchasing electricity at the wholesale level; and
- peak load reduction credits for consumers with large loads who enter into pre-established peak load reduction agreements that reduce a utility's planned capacity obligations.

Since the system can track user position quite accurately, the system can store and analyze personal information including medicine taking habits, eating and drinking habits, sleeping habits, or excise habits. The information can be used to track the user's general health.

Optical building solutions embody the prevailing goal of sustainable buildings: Reduce, Reuse, Recycle. Fewer wired and more wireless solutions mean less disposed cabling will end up in landfills and less waste will be burned and emitted as toxic gases into the environment.

System Retrofits—Wireless optical solutions are ideally suited for existing spaces because they eliminate the need to remove floors, walls or ceilings to access control products. People or processes no longer need to relocate while upgrades are under way, allowing continued access to labs, sensitive storage, health facilities and critical process areas.

Reconfiguring Space—Open floor plans, multi-purpose areas or temporary spaces can now be automated. Wireless optical controls and optical sensors can be easily moved to suit the needs of tenants or one-time events. Conference and exhibition halls, warehouses, and auditoriums are just a few examples of spaces that are frequently restructured for different purposes.

Structural Restrictions—Buildings or areas with concrete, marble and cinderblock can now be wirelessly controlled using light. Spaces with atriums, high ceilings, historical features and other unique architectural elements can now be controlled wirelessly and without expensive wiring or worry of damaging unique architectural features.

Sensitive Environments—Facilities such as hospitals, museums, labs and data centers often house materials requiring very precise and stable air conditioning and are ideally suited for wireless optical control. With non-invasive installation, wireless optical control products make it possible for these areas to perform to the best of their ability.

In addition to being directed to the embodiments described above and claimed below, the present invention is further directed to embodiments having different combinations of the features described above and claimed below. As such, the invention is also directed to other embodiments having any other possible combination of the dependent features claimed below.

The present invention may be embodied in other specific forms without departing from the spirit or essential attributes thereof, and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

What is claimed is:
1. A system comprising:
a. one or more light emitting diodes (LEDs) electrically coupled to at least one electrical connector compatible with a conventional light connector, wherein the LEDs include at least one broadband optical transmitter and receiver optically coupled to a broadband optical network greater than 1 Mbps using at least one LED with a first mode to generate light and a second mode to receive broadband optical transmissions using ambient light; and b. a controller coupled to the LEDs, the controller adjusting LED light output and communicating with the optical network using the broadband optical transmitter and receiver.

2. The system of claim 1, comprising an audio transducer in the bulb receiving music or sound data transmitted over the optical network.

3. The system of claim 1, wherein each light bulb stores positioning or location information to uniquely identify a position of an occupant.

4. The system of claim 1, wherein the controller minimizes LED operating cost by shifting energy use to an off-peak period in response to utility pricing that varies energy cost by time of day.

5. The system of claim 1, wherein the optical network communicates lighting profiles that incorporate time-based control with occupancy, daylighting, and manual control and wherein the controller integrates time-based lighting control with occupancy sensing control.

6. The system of claim 1, wherein the at least one electrical connector includes an electrode selected from a group consisting of: a pair of bi-pin end caps configured for engagement with a standard fluorescent tube receiving fixture; and an Edison screw connector for a light bulb.

7. The system of claim 6, comprising a user replaceable circuit board in electrical communication with at least one of the bi-pin end caps, and wherein the controller and at least one LED serving as the optical transmitter and receiver are mounted on the circuit board and in electrical communication therewith; and wherein the at least one LED includes multiple LEDs that output an amount of light substantially equal to an amount of light produced by a conventional fluorescent tube.

8. The system of claim 1, wherein one or more LEDs detect one or more of motion and sound.

9. The system of claim 1, wherein the light bulb comprises a receiver that receives an auxiliary signal generated from a source outside the bulb indicative of whether the one or more rooms in the building are in the occupied state or unoccupied state; and wherein the controller is operable to control the at least one LED in response to the auxiliary signal.

10. The system of claim 1, wherein the controller estimates an amount of power being used by the building and controls the at least one LED based on the estimated amount of power.

11. The system of claim 1, wherein controller controls at least one of a temperature setting, an airflow setting, a humidity setting, and a brightness setting of a building environment regulator.

12. The system of claim 1, comprising: an LED-based light, at least one LED, a sensor operable to output a first signal indicative of whether an area of one or more of the rooms is in an occupied state or a non-occupied state, an LED controller operable to control the at least one LED in response to the first signal, and a transmitter operable to transmit a second signal indicative of whether the area is in the occupied state or the non-occupied state; and a regulator controller in communication with the transmitter and operable to control one or more functions of the building environment regulator in response to the second signal.

13. The system of claim 1, wherein the at least one optical transceiver is constructed and arranged to communicate with a thermostat, a video camera, a public address system, a smoke detector, an identification tag, a name tag.

14. The system of claim 1, comprising a user replaceable circuit board having a plurality of light emitting diodes and at least one photodetector attached thereto and wherein the controller communicates with the broadband over power line communications system.

15. The system of claim 1, comprising a multiband-type ultra-wideband (UWB) receiver having one or more optical channels defined using one or more OFDM bands.

16. The system of claim 1, plurality of optical transceivers can be used where each the transceiver includes an optical data communications transmitter configured to modulate data to be transmitted onto an optical output of the transceiver and an optical data communications receiver configured to receive an optical signal and to demodulate the received signal to recover transmitted data, and wherein transmitter is configured to spread the transmitted data using a pseudorandom sequence, and wherein the receiver in configured to despread the received optical signal to recover the transmitted data.

17. The system of claim 1, comprising a routing table storing an identifier that uniquely identifies a path through the network to a destination for a data packet, wherein when a transceiver initially connects to an optical network a unique identifier is broadcasted to other transceivers (nodes) within range for configuration of a local routing table, and forwarded by the nodes to other nodes within the network to make the network aware of the new connection.

18. The system of claim 1, comprising a plurality of LEDs that transmit and receive at different wavelengths to transmit data in parallel over different wavelengths.

19. A system comprising:
a. one or more light emitting diodes (LEDs) electrically coupled to at least one electrical connector compatible with a conventional light connector, wherein the LEDs include at least one multiband-type ultra-wideband (UWB) transceiver having one or more optical channels defined using one or more OFDM bands; and
b. a controller coupled to the LEDs, the controller adjusting LED light output and communicating with the optical network using the optical transmitter and receiver.

20. An LED-based light operable in cooperation with a building environment regulator that provides high speed data communication and regulates at least one environmental condition in one or more rooms of a building, the LED-based light tube comprising:
a tube including a light transmitting portion and a pair of electrical connectors attached to opposing ends of the tube, the electrical connectors compatible with a standard fluorescent light fixture;
one or more first LEDs operable to produce light that passes through the light transmitting portion of the tube;
one or more second LEDs operable as a light sensor to generate a first signal whether an area of one or more of the rooms is in an occupied state or a non-occupied state;
one or more third LEDs providing an optical communication system with WiFi or DSL speed; and
a controller operable to control the first LEDs in response to the first signal and communicating with other devices through the one or more third LEDs the first signal indicative of whether the area is in the occupied state or the non-occupied state to the building environment regulator.

* * * * *